US011481755B2

United States Patent
Rogers et al.

(10) Patent No.: US 11,481,755 B2
(45) Date of Patent: Oct. 25, 2022

(54) MULTI-VENUE FOOD-SERVICE TRANSACTION FULFILLMENT USING UNIQUE SYSTEM-WIDE IDENTIFIERS

(71) Applicant: IQMetrix Software Development Corporation, Vancouver (CA)

(72) Inventors: Garett Rogers, Vancouver (CA); Laurent May, Vancouver (CA); Ryan Volberg, Vancouver (CA); Phil Brockmeyer, Vancouver (CA); Zoran Kovacevic, Vancouver (CA)

(73) Assignee: IQMetrix Software Development Corporation, Vancouver (CA)

( * ) Notice: Subject to any disclaimer, the term of this patent is extended or adjusted under 35 U.S.C. 154(b) by 0 days.

(21) Appl. No.: 16/384,635

(22) Filed: Apr. 15, 2019

(65) Prior Publication Data

US 2020/0327531 A1 Oct. 15, 2020

(51) Int. Cl.
*G06Q 20/32* (2012.01)
*G06Q 20/20* (2012.01)
(Continued)

(52) U.S. Cl.
CPC ....... *G06Q 20/3224* (2013.01); *G06Q 20/027* (2013.01); *G06Q 20/202* (2013.01);
(Continued)

(58) Field of Classification Search
CPC ........ G06Q 20/20; G06Q 20/00; G06Q 30/00; G06Q 50/12; G06Q 30/02; G06Q 30/06;
(Continued)

(56) References Cited

U.S. PATENT DOCUMENTS 5,838,798 A * 11/1998 Stevens, III ......... G06Q 20/202
186/39
6,873,970 B2 * 3/2005 Showghi ................ G06Q 30/06
705/26.81
(Continued)

FOREIGN PATENT DOCUMENTS

WO 20170100865 A1 6/2017

*Primary Examiner* — Olusegun Goyea
(74) *Attorney, Agent, or Firm* — Michael A. Bondi; Moss & Barnett

(57) ABSTRACT

A method of processing orders and payments in a location-based food-service venue such as a restaurant, stadium or arena. Each customer location has a physical identity target attached in proximity thereto comprising a unique system-wide identifier readable by customer mobile devices. Targets might be visually readable, using QR codes or the like, or might be a short range radio beacon broadcasting the identifier (NFC, RFID etc.)—they do not contain human-readable location indication information. The identifiers associated with the targets do not contain location- or venue-specific information, and are recorded in relation to location records corresponding to individual customer locations in the venue in a order database held on a server. On reading of a target by a customer device and a related location transmission to a server, the server can associate the transmission with its related customer location in the venue-associated POS system, facilitate a selection of items for ordering regarding the location and facilitate an ordering transaction for the amount owing at the selected customer location through a transaction gateway, and provide a transaction completion indication to the POS system. The method allows for enhanced velocity in deployment and maintenance of location targets, and enables mobile device-based ordering and payment in venues previously not offering same. Systems and software are also disclosed.

23 Claims, 7 Drawing Sheets

(51) Int. Cl.
  *H04W 4/021* (2018.01)
  *G06Q 20/02* (2012.01)
  *G06Q 50/12* (2012.01)
(52) U.S. Cl.
  CPC ......... *G06Q 20/3276* (2013.01); *G06Q 50/12* (2013.01); *H04W 4/021* (2013.01)
(58) Field of Classification Search
  CPC ........ G06Q 10/00; G06Q 10/08; G06Q 20/12; G06F 7/08
  USPC ......... 705/15, 14.1, 5, 7.22, 21, 26.41, 26.1, 705/26.8, 20; 455/414.1, 456.3, 404.2, 455/403
  See application file for complete search history.

(56) References Cited

U.S. PATENT DOCUMENTS

| | | | | |
|---|---|---|---|---|
| 7,035,618 | B2* | 4/2006 | Schnurr | H04W 4/029 455/403 |
| 7,353,033 | B2* | 4/2008 | Kwon | H04W 4/029 709/219 |
| 7,945,477 | B2* | 5/2011 | Werbitt | H04W 4/029 342/357.22 |
| 8,175,913 | B2* | 5/2012 | Checketts | G06Q 20/102 705/28 |
| 8,447,067 | B2 | 5/2013 | Rhoads | |
| 8,452,667 | B1* | 5/2013 | Shimoff | G06Q 30/00 705/26.1 |
| 9,373,091 | B1* | 6/2016 | Belser | G06Q 20/00 |
| 9,495,701 | B2* | 11/2016 | Bressan | G06Q 30/06 |
| 9,659,102 | B1 | 5/2017 | Cronin | |
| 9,733,271 | B2 | 8/2017 | Hosein | |
| 9,870,585 | B2 | 1/2018 | Cronin | |
| 10,157,414 | B2* | 12/2018 | Werbitt | H04L 67/12 |
| 10,482,524 | B1* | 11/2019 | Daskalakis | G06Q 30/0635 |
| 2002/0137525 | A1* | 9/2002 | Fleischer | H04W 4/02 455/456.3 |
| 2003/0050854 | A1* | 3/2003 | Showghi | G06Q 10/06312 705/15 |
| 2003/0083889 | A1* | 5/2003 | Macklin | G06Q 30/02 705/5 |
| 2003/0088469 | A1* | 5/2003 | Leifer | G06Q 30/02 705/15 |
| 2003/0126016 | A1* | 7/2003 | Asano | G06Q 20/326 705/15 |
| 2004/0034564 | A1* | 2/2004 | Liu | G06Q 30/02 705/15 |
| 2004/0054585 | A1* | 3/2004 | Baratz | G06Q 50/12 705/14.1 |
| 2004/0054592 | A1* | 3/2004 | Hernblad | G06Q 20/322 705/15 |
| 2004/0143503 | A1* | 7/2004 | Suthar | G06Q 30/06 705/15 |
| 2006/0186197 | A1* | 8/2006 | Rosenberg | G06Q 30/00 235/375 |
| 2007/0198360 | A1* | 8/2007 | Rogers | G06Q 30/0613 705/16 |
| 2010/0211436 | A1* | 8/2010 | Checketts | G06Q 10/0833 705/28 |
| 2011/0093302 | A1 | 4/2011 | Hernandez | |
| 2012/0191522 | A1* | 7/2012 | McLaughlin | G06Q 50/01 705/26.8 |
| 2014/0046802 | A1* | 2/2014 | Hosein | G01R 1/06711 705/26.61 |
| 2014/0052551 | A1* | 2/2014 | Bressan | G06Q 30/06 705/15 |
| 2015/0032567 | A1* | 1/2015 | Bhatia | G06Q 30/06 705/26.8 |
| 2015/0356664 | A1* | 12/2015 | Mackler | G06Q 30/0635 705/26.81 |
| 2016/0189287 | A1* | 6/2016 | Van Meter | H04W 4/029 705/15 |
| 2017/0357959 | A1 | 12/2017 | Checketts | |
| 2018/0047092 | A1 | 2/2018 | Hennessy | |
| 2018/0075518 | A1* | 3/2018 | Werbitt | H04W 88/02 |
| 2018/0130118 | A1* | 5/2018 | Guran | G06Q 20/4014 |
| 2019/0370887 | A1* | 12/2019 | Pretorius | H04W 4/021 |

* cited by examiner

MULTI-VENUE FOOD-SERVICE TRANSACTION FULFILLMENT USING UNIQUE SYSTEM-WIDE IDENTIFIERS

FIELD OF THE INVENTION

This invention is in the field of POS systems and methods for restaurants and other location-based food-service venues, and deals with a method of facilitating customer payments using non-location-based identity targets related to customer locations within the venues.

BACKGROUND

Continued evolution and service development across many industries, including many service industries, requires the application of computer technologies to customer facing services to offer enhanced and customized services with optimized efficiency to the profitability of the business. One industry in which the development of electronic service offerings has lagged behind others is that of the hospitality industry—restaurants, bars and the like. Particularly in quicker service establishments where it is desired to provide an element of self-service and enhanced checkout speed, which will please customers and result in an increased turnout of table locations to potentially enhance profitability of the business, the ability to provide for self-service or enhanced velocity in ordering and payment transactions would be appreciated both by customers and the location-based food-service venues in which they are dining or making other purchases.

The widespread availability of customer mobile devices, such as smart phones has enhanced further the proliferation of device facilitated business transactions. Virtually every customer has at least one smart phone or mobile device, and so payment methods which incorporate the use of those devices can be made widely available, and with the comfort level with those devices of users are generally widely accepted.

Payment methods have been developed for restaurants and similar location-based food-service venues which rely upon human data entry of a seating location into an app or a website available on a smart phone or similar user device. This typically involves either transposing the seating location within the restaurant printed on a label affixed near the chair in the establishment, or on the paper bill provided by the waitperson. However, the need for transposition of numerical seating locations or the like by data entry by the user on their user device can cause errors. If it were possible to provide a means of facilitating rapid self-service ordering and payment in location-based food-service venues such as restaurants, bars or the like, which did not rely upon human data entry to properly enter and select the location, this would be more widely accepted by users.

Many previous attempts would have included the need for installation of significant quantities of specific software or hardware addons or upgrades to venue-associated POS systems to facilitate such self-service payment approaches. Specific network hubs or hardware systems to allow integration with site-based POS systems significantly increase the cost and complexity of such approaches and limit their market adoption rate. If it were possible to provide this type of a smart device-enabled self-service payment option for location-based food-service venues using pre-existing network connections of site-based POS systems, or requiring only a limited modification to allow for wide area network connectivity with customer mobile devices this would also enhance the marketability of such service offerings.

Previous attempts have been made to streamline self checkout capabilities in restaurants by placement of a machine-readable label at individual customer locations within the location-based food-service venues. For example each table in a restaurant, or each seat at a table in a restaurant, has a label attached which can be scanned by a typical QR code scanner or the like on the smart phone of the user, and which machine-readable code includes an indication specifically of the seating location within the venues which can be directly matched back to the seating location in the restaurant POS system, to facilitate the payment of corresponding service charges. For example see U.S. Pat. No. 9,117,231 to Qikserve Ltd., entitled "Ordering System and Method for Restaurants". Systems such as the Qikserve system outlined above however are not rapidly scaleable or easily maintained insofar as they require the printing of customized labels for use at each seating or associated customer location within a location-based food-service venue—for example, where each seat has a label attached corresponding thereto, following detailed layout planning of the venue labels need to be individually printed corresponding to each location, and if a label is ruined in installation or in prolonged use, individual customized labels need to be reprinted for attachment in their place. The need for custom label printing equipment either permanently onsite or on behalf of system vendors or maintenance, introduces an element of complexity in installation and maintenance which can limit the uptime or venue satisfaction and cost with the use of such systems. Alternate systems allowing for location-based payment facilitation in location-based food-service venues using customer mobile devices, which would limit or eliminate the complexities of location-specific labelling would be preferential.

A system which permitted for the rapid installation of a self-serve ordering and payment system such as in stadiums, arenas and other large volume location-based areas would be desirable. However, a system which required custom printing of labels or custom imprinting or configuration of identifiers used regarding individual seats or associated customer locations within such a large self-serve venue would be complicated and cost prohibitive, where the exact right identifier needed to be matched up with the exact right seat, add custom printing was required for any replacements. A system which permitted for rapid deployment of a system of identifiers and enabling self-serve ordering and payment would be preferable and novel over such previous attempts.

SUMMARY OF THE INVENTION

One aspect of the present disclosure relates to a method for the ordering of and payment for food-service items for delivery to physical customer locations within at least one food-service venue containing a plurality of customer locations and at least one network-connected venue-associated POS system, wherein each customer location has a physical identity target attached in proximity thereto comprising a unique system-wide identifier readable by customer mobile devices. A server includes an order processing software component, a network interface capable of two-way communication via at least one data network with customer mobile devices and with the venue-associated POS systems, a connection to a transaction gateway through which customer payments can be processed, and an order database.

The order database includes a venue record corresponding to each location-based food-service venue and containing venue payment details via which payments to the venue can be electronically processed by the transaction gateway and network address details for each venue-associated POS system by which the server can communicate with same; a location record corresponding to each physical customer location in each managed venue and containing the unique identifier of the associated physical identity target and identification of a venue-associated POS system affiliated with the customer location; and a menu item record corresponding to each menu item which can be ordered within a venue including purchase information regarding the menu item and identification of a menu-associated POS system being the venue-associated POS system to which orders for the menu item should be transmitted.

In a customer-initiated ordering step, an ordering and payment transaction can be initiated regarding one or more customer locations within a venue. The server, operating under the order processing software component and in communication with the customer mobile device of an ordering customer, would receive a location transmission containing the identifier of the physical identity target of at least one selected customer location from the customer mobile device having read and captured the identifier. Sometimes the physical identity target of the at least one selected customer location will have been read by a camera or scanner app on the customer mobile device, and where the target was not visually readable but instead was a broadcasting transmitter or the like, such as an RFID or NFC tag or beacon, a receiver on the customer mobile device would read the target/beacon and extract the information.

On receipt of a location transmission of the server, the server would parse the received location transmission to extract the received identifier of the physical identity target for each of the at least one selected customer locations which had been read by the customer using their customer mobile device. The server and the order processing software component would then query the order database to identify a subset of the location records therein, corresponding to the at least one selected customer location—these are the selected location records. This would be done by matching the received identifiers of the physical identity targets extracted from the location transmission, with the details of the unique identifiers related to individual location records stored within the location records.

Having identified the selected location records, the server would then facilitate the selection and ordering of menu items available at the at least one selected customer location by first identifying menu item records from the order database which correspond to available menu items for the selected location records, being available menu item records identifying available menu items. Some menu items may not be available at every location within a venue, so the structure of the order database and the menu item records therein could be created so subsets of menu items and the menu item records could be extracted for this purpose.

Having identified the available menu item records, the menu item details of the available menu items would be transmitted from the server to the customer mobile device for display on a human interface of the customer mobile device, and the customer could interact with their device and the server to select available menu items to be ordered regarding the at least one selected customer location. The details of the selected menu items would then be transmitted back or confirmed back by the customer mobile device to the server. It is specifically contemplated that the ordering interaction outlined could be conducted between the server and the customer mobile device and a browsing session, or using proprietary local client software installed on the client mobile device.

The ordering customer having identified the selected menu items, payment for the transaction can be processed. The server would calculate the total payment amount required from the customer for the selected menu items, and would receive customer payment method details from the customer mobile device. The customer payment method details might be credit card particulars authentication or credentials against a online wallet permitting for an electronic funds transfer or many other types of payment methods, the only limitation to which would be that whatever payment method was identified by the customer, the transaction gateway of the server of the present invention would need to process same.

Following the receipt of customer payment method details regarding the total payment amount at the server from the customer mobile device, an ordering transaction would be triggered for the total payment amount via the transaction gateway operatively connected to or integrated with the server, using the customer payment method details obtained from the customer mobile device and the venue payment details from the venue record associated with the selected customer locations. The specifics of transaction gateway transaction processing will be understood to those skilled in the art and are all contemplated within the scope of the present invention.

On completion of the payment transaction by the gateway, the server would finally transmit an order for each of the selected menu items now paid for to the menu associated POS systems associated with each of those selected menu items, in their menu item records selected from the order database. Where there is only one POS system in a venue, the order might be transmitted to that system, whereas in other venues having more than one venue-associated POS system in place, the venue-associated POS system which is the menu-associated POS system for certain of the menu items and identified in their corresponding menu item records might vary.

A key element of the method of the present invention is that the systemwide identifier displayed on each identity target regarding a customer location would include no venue or location specific information requiring custom printing. The identity target may or may not also include any human readable information. Insofar as the systemwide identifier used regarding each customer location and stored in the corresponding location record would not correspond directly to the venue or the location i.e. it would effectively comprises systemwide serial number, random token or the like, it is easy to replace a particular identity target as required with no significant custom printing or customization requirements. The identifier used on each physical identity target would be different systemwide i.e. it would not match the identifier used on any other identity target on any other customer location in any venue connected to the system. Using generic systemwide serial identifiers not customized and do not specifically correspond to the venue or the customer location within the venue represents a significant and patentable improvement over the state-of-the-art insofar as the speed of deployment and maintenance of systems employing the method of the present invention with no custom printing or manufacture of the physical identity targets for each customer location will be understood by those skilled in the art.

As outlined above and elsewhere herein, it is explicitly contemplated that order and payment transactions could be initiated by a customer under the method of the present invention regarding one or more selected customer locations within a location-based food-service venue. For example, this might make it easy for individual customers at a table of multiple customers to order by initiating a single payment transaction for the bill associated on the venue-associated POS system with each individual seat or associated customer location, or in other cases, where it was desired to pay the bill regarding the entire table, the customer initiating the payment could use their customer mobile device to read the physical identity target of each seat at the table, so for example in a table of six people in this scenario, the location transmission initiated from the customer mobile device to the server could include six identifiers [or in other cases six individual selected location transmissions could be originated].

The physical identity targets themselves could be a visually readable label or electronic display, displaying an indicia such as a QR code or a barcode which related software on the customer mobile device could read. With a electronic display device displaying a visually readable indicia for the identifier, the electronic display device could be updated as required if it was desired to use dynamic identifiers versus static identifiers.

A second type of physical identity target which could be used would be a short range radio beacon, such as a NFC or RFID beacon or tag, which would be readable by a reader within the customer mobile device. In such a case the physical identity target broadcasts the identifier associated with the customer location and is readable by radio rather than by vision or scanning with the camera or the like of the customer mobile device. Use of beacons, which are understood by those skilled in the art, would allow for concealed installation of the physical identity targets and might be desired in a permanent or upscale installation where it was desired to not place many targets regarding customer locations on the tables or other services related to the customer locations within the venue.

It may also be the case in certain circumstances, again using the example of a restaurant, that a single physical identity target could be provided which would allow for practice of the method of the present invention regarding multiple customer locations at one time—for example, a table in a restaurant might include a physical identity target regarding each chair at the table, and there might be another target provided which had a separate identifier expressed thereon which was programmed on the back end to correspond to the seats at the table, so that if someone wished to generate a transaction regarding all the seats at the table they could scan the one table target rather than scanning all of the seat targets at the table. The necessary modifications to the system of the present invention to allow to include this additional layer of customization will be obvious to those skilled in the art and are contemplated within the scope hereof as well.

As outlined in further detail throughout, the location-based food-service venues of the present invention could be hospitality venues such as restaurants, bars or the like, or might comprise any other type of a location-based food-service venue being any type of a business establishment in which customer charges were calculated or aggregated regarding individual customer locations within the venue. All such venues and all such approaches are contemplated within the scope hereof.

Some location-based food-service venues might include more than one POS system, with certain customer locations within the venue allocated to one POS system and others to another. It is expressly contemplated and encompassed by the claims outlined that the system could accommodate location-based food-service venues including more than one venue-associated POS system, by having the information for network communication between the server and any necessary venue-associated POS systems stored in the venue record of the order database, and storing also in the order database likely in the location record corresponding to each customer location information related to the particular POS system to which a particular location is assigned. Besides having individual customer locations in a particular venue associated with different POS systems associated with the venue, it may also be the case that dependent upon the menu items to be ordered certain menu items might be processed by one POS system and certain others by another—for example in a restaurant it may be the case that one POS system receives and processes drink orders and another POS system receives and processes orders for the kitchen for food items. These different POS systems in such a scenario are referred to herein as menu-associated POS systems, and there could be a different one for each menu item record and menu item.

As also outlined above it is explicitly contemplated the system and method of the present invention could be practiced in many venues using a single server and backend system. The method of the present invention could either be used in one venue, with a single server, network connection and the like, or in a multiple venue scenario, multiple venues of even multiple proprietors could use the same system with the appropriate authentication and security and communication channels established between the venue-associated POS systems and the server. Again any necessary modifications to the system and method of the present invention to accommodate the use in one or more venues of one or more vendors will be understood to those skilled in the art and are all contemplated within the scope of the present invention.

The physical identity target at a customer location in a venue using the system of the present invention could be read by the customer mobile device using pre-existing software on the customer mobile device, such as a scanner and browser combination, or a specific client app could also be developed and installed on customer mobile devices to facilitate participation in the method of the present invention. Both such approaches are contemplated within the scope of the present invention. Whether pre-existing software or and installed proprietary client app were used, reading the identifier from a physical identity target regarding a customer location in a venue would cause the initiation of a location transmission to the server and an ordering transaction.

The server in communication with the customer mobile devices could also facilitate the operation of tipping, bonuses and the like in the calculation of the total payment amounts and this will be understood to be contemplated within the scope of the present invention. Once the payment transaction or a particular order is processed, the necessary information to provide POS system reconciliation and/or vendor information to allow the venues to reconcile their funding and orders can all be captured, reported and communicated.

In some implementations of the method, the server may be a web server. In some implementations of the method, the identifier contains a web link and the pre-existing software includes a reader capable of parsing the identifier to extract or look up the web link or other identifier matter. In some implementations of the method, the pre-existing software also may include a web browser which will open the parsed web link to initiate the location transmission and subsequent payment interaction between the customer and the server.

The server could include the transaction gateway software or hardware to process payment transactions directly, or in other embodiments of the server in the method of the present invention, a transaction gateway might be integrated with the server that was externally located, via an appropriate network connection.

It is specifically contemplated that the method of the present invention could be optimally used in large location-based menus, such as to provide in the seat ordering and delivery capabilities in stadiums, arenas and the like. The benefits provided by the engineer is sized unique identifier approach taken with the physical identity targets for individual seats or locations within the venue will be obvious— for example in a football stadium containing 75,000 seats, it would not be necessary under the method of the present invention to custom print or customer can figure 75,000 physical identity targets be they labels, beacons or the like and rather 75,000 random or sequentially systemwide identifiers could be used. In such a large venue it will also be understood that transmission of orders to the appropriate venue associated POS system may in certain cases result in an order received by POS system, once produced, being delivered to the particular customer location regarding which the order was placed, and in other cases it may be that the customer mobile device would be advised by transmission from the server of an assigned pickup location assigned by the server and software and POS configuration of the venue, allowing the customer to attend at a particular location to pick up their ordered and paid menu items. Both such embodiments, namely those incorporating delivery of the generated and produced orders for paid menu items, and others regarding which pickup locations were assigned regarding the order for the customer to pick up their completed order, are contemplated within the scope of the present invention.

Another aspect of the present disclosure relates to a server configured for the processing of payments for at least one location-based food-service venue containing a plurality of customer locations and at least one network-connected venue-associated POS system, wherein each customer location has a physical identity target attached in proximity thereto comprising a unique system-wide identifier readable by customer mobile devices. The server may include a non-transient computer-readable storage medium having executable instructions embodied thereon. The server may include one or more hardware processors configured to execute the instructions. The processor(s) may execute the instructions to provide a server including a order processing software component for carrying out the steps of the method, a network interface capable of two-way communication via at least one data network with customer mobile devices and with the venue-associated POS systems, a connection to a transaction gateway through which customer payments can be processed, and an order database including a venue record corresponding to each location-based food-service venue and containing venue payment details via which payments to the venue can be electronically processed by the transaction gateway and network address details for each venue-associated POS system by which the server can communicate with same; a location record corresponding to each physical customer location in each managed venue and containing the unique identifier of the associated physical identity target and identification of a venue-associated POS system affiliated with the customer location; and a menu item record corresponding to each menu item which can be ordered within a venue including purchase information regarding the menu item and identification of a menu-associated POS system being the venue-associated POS system to which orders for the menu item should be transmitted.

The processor(s) may execute the instructions to, in a customer-initiated ordering step, receive a location transmission containing the identifier of the physical identity target of at least one selected customer location from the customer mobile device having read and captured the identifier. On receipt of a location transmission of the server, the server would parse the received location transmission to extract the received identifier of the physical identity target for each of the at least one selected customer locations read by the customer using their customer mobile device. The server and the order processing software component would then query the order database to identify a subset of the location records, corresponding to the at least one selected customer location—these are the selected location records. This would be done by matching the received identifiers of the physical identity targets extracted from the location transmission, with the details of the unique identifiers related to individual location records stored within the location records.

The remainder of the order processing transaction and workflow conducted by the server and the order processing software component would be as outlined above regarding the overarching method of the present invention. It is specifically contemplated that the server could have a Web server components capable of browser session communication with the customer mobile devices of ordering customers and that is one primary means of communication and transaction completion between the server and multiple customer mobile devices. In other embodiments it will be understood that the customer mobile devices might contain proprietary software applications capable of network communication with the server and transactions could be completed in that fashion as well.

The server would need to be capable of network communication with the customer mobile devices of customers seeking to place orders and transact business with the venues deploying the method of the present invention and would also need to be capable of network communication with the venue associated POS systems of the venues within the system. Development of the communication protocols and software for the communication of the server with various venue associated POS systems, the same or of multiple communication protocols and types, is all contemplated within the scope of the present invention.

As outlined above regarding the method, it is contemplated as well in terms of the order database and the server outlined, that the systemwide identifier displayed on each identity target regarding a customer location would include no venue or location specific information requiring custom printing. The identity target might also include any human readable information. Insofar as the systemwide identifier used regarding each customer location and stored in the corresponding location record would not correspond directly to the venue or the location i.e. it would effectively comprises a systemwide serial number, random token or the like, it is easy to replace a particular identity target as required with no significant custom printing or customization requirements. The identifier used on each physical identity target would be different systemwide i.e. it would not match the identifier used on any other identity target on any other customer location in any venue connected to the system. Using generic systemwide serial identifiers that are not customized and do not specifically correspond to the venue or the customer location within the venue represents a significant and patentable improvement over the state-of-the-art insofar as the speed of deployment and maintenance of systems employing the method of the present invention with no custom printing or manufacture of the physical identity targets for each customer location will be understood by those skilled in the art.

The server outlined and disclosed will permit the completion of customer order and payment transactions regarding selected customer locations and location-based food-service venues, under the method outlined above.

These and other features, and characteristics of the present technology, and the methods of operation and functions of the related elements of structure and the combination of parts and economies of manufacture, will become more apparent upon consideration of the following description and the appended claims referring to the drawings, which form a part of this specification, wherein like reference numerals designate corresponding parts in the figures. It is to be understood, however, that the drawings are for illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

While the invention is claimed in the concluding portions, preferred embodiments are provided in the detailed description which may be best understood with the diagrams where like parts in each of the several diagrams are labeled with like numerals, and where:

DETAILED DESCRIPTION OF ILLUSTRATED EMBODIMENTS

To appreciate the functionality of the present invention it is beneficial to establish certain terminology used in the remainder of the specification to describe the invention. The invention comprises an ordering and payment system for use in conjunction with location-based food-service venues such as restaurants, stadiums and arenas or the like, where products are sold in relation to multiple customer locations or seating locations in the venue. For example in a restaurant, each table in the restaurant or in a more granular way each seat in the restaurant might constitute a separate customer location. While it is explicitly contemplated that the food-service venues would include restaurants, bars and the like, this could also be used in several other venues which had specifically enumerated customer locations—sports venues etc. come to mind. Any type of a food-service venue with multiple customer locations in respect of which purchases of products or services might be posted to a POS system for payment is contemplated within the scope of the present invention.

A customer location comprises a specific billable location within a food-service venue. For example in the restaurant at which the POS system captured purchases at the table level, each table might comprise a customer location. In other restaurants or food-service venues where a more granular billing system was used down to individual seating or standing positions for service or purchase, individual seats might each comprise an individual customer location. In arenas or stadiums where a large-scale in situ ordering employment of the method of the present invention might be desirable, is explicitly contemplated that individual seats within the venue would each comprise a customer location.

Within a location-based food-service venue there would be at least one venue-associated POS system. The venue-associated POS system is the system in which purchases for individual customer locations are catalogued for subsequent payment, charging or purchase. There are numerous pre-existing venue-associated POS systems for hospitality establishments and other types of location-based food-service venues regarding which the method of the present invention could be employed if that pre-existing venue-associated POS system was capable of network communication with the server. Some food-service venues might actually have more than one venue-associated POS system depending on size or complexity. With a venue having more than one venue-associated POS system, each customer location within the venue would typically be assigned to a particular POS system for billing.

Figure 1:
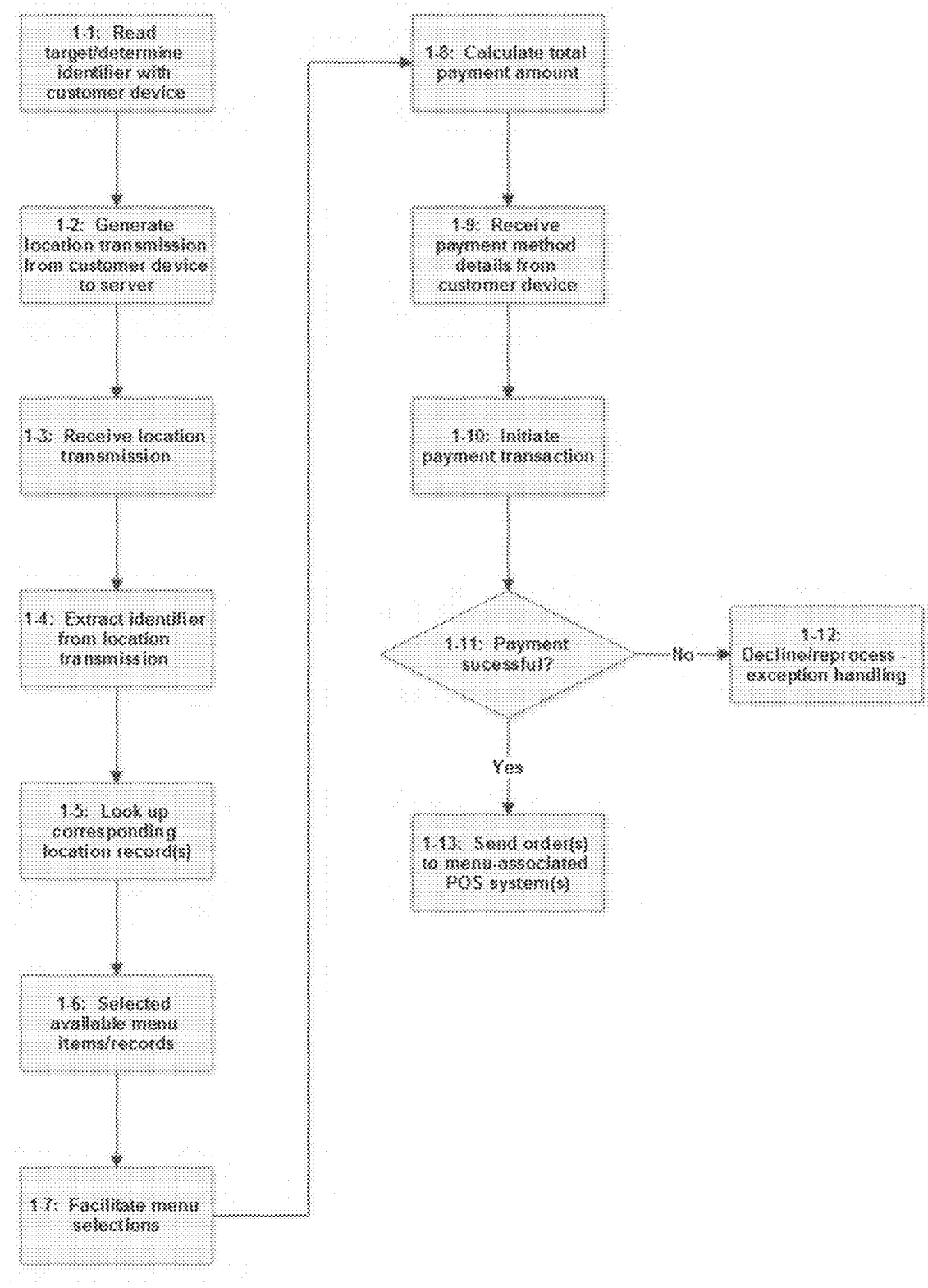
FIG. 1 is a flow chart showing the steps in one embodiment of the method of the present invention.

Method Overview:

Referring to FIG. 1 there is shown a flow chart outlining the steps involved in one embodiment of the method of the present invention, to assist a customer in an ordering and payment transaction regarding a customer location within a location-based food-service venue as outlined herein. Each customer location within the food-service venue would have a physical identity target attached in association therewith, which was readable by a customer mobile device to yield the reading of an identifier in relation to the customer location. The identifier as outlined elsewhere herein would be unique systemwide, and would include no venue or location-based indication—the use of random or serial systemwide identifiers, which are equated to location records in the order database on the backend, results in a more rapidly deployed and serviced system which is less reliant upon any custom printing or custom configuration at the venue end to implement and operate, yielding a more palatable system for the customer. That the physical identity target is machine-readable, versus requiring human intervention to manually transpose a serial code or the like into a computer program to allow for customer initiated self-service payment is another significant commercial benefit to the system and method of the present invention. In some implementations, the method of FIG. 1 may be accomplished with one or more additional operations not described, and/or without one or more operations discussed. Additionally, the order in which the operations of the method are illustrated in FIG. 1 and described below is not intended to be limiting.

The first two steps shown in this demonstrate the steps of the customer actually initiating the ordering transaction by reading the physical identity target regarding their desired customer location(s). Shown at 1-1, the customer will use their customer mobile device 2 to read the physical identity target of the method disposed at or regarding the customer location regarding which they wish to initiate an ordering transaction—as outlined that would either be a scannable or visually readable label or the like capable of reading by a camera and a scanning app on the device, or in other cases might be a short range broadcasting radio beacon, including an RFID tag or an NFC beacon, which would broadcast the identifier for the remainder of the method. Software on the device would extract or process the information read from the target, to yield the unique system identifier of the target, and would transmit that identifier to the server of the present invention within a location transmission, shown at 1-2. The customer mobile device 2 would include the necessary hardware and software to read a physical identity target, each target including a unique identifier which is not repeated systemwide, and which can be matched by a order database lookup against a order database to correlate the target to the actual customer location regarding which it is provided.

Once the target was read by a customer mobile device and the identifier extracted regarding a particular customer location in a serviced venue regarding which it was desired to facilitate a transaction payment, the identifier could be used to initiate a transaction payment—by triggering a location transmission from a customer mobile device 2 to the server 1. Using the example above of the actual encoded identifier within the target comprising a network address or link, a browser or other software on the customer mobile device opening that link, resulting in the opening of a communication session with the server 1 regarding the particular identifier, could constitute the initiation of a location transmission. In other cases, purpose built client software under the remainder of the method of the present invention installed on the customer mobile device 2 used to read the identifier from a physical identity target of a particular customer location within a venue could specifically open a transmission. Both such approaches are contemplated within the scope of the present invention.

Upon receipt of a location transmission by the server, in step 1-3, the server 1 with the order processing software 7 and other components will initiate an ordering transaction. The first step in that transaction in accordance with the method will be the extraction of the identifier of the physical identity target corresponding to the selected customer location from the location transmission. This is shown at step 1-4. The specifics of the disassembly or parsing of a location transmission packet or packets to yield transmitted information over a computer network will be understood by those skilled in the art of software, hardware and communications design and any type of an approach resulting in the transmission of the identifier of the physical identity target of the customer location from the customer mobile device to the server, and the subsequent extraction of that identifier from the location transmission, are understood to be within the scope of the present invention. It is primarily contemplated that the use of an extractable identifier which included a network address such as the https://payserver.com/12erQ435pz.htm example outlined above would be the most easily deployed regarding the largest number of customer mobile devices 2 and it is explicitly contemplated this approach where the identifier which could be extracted from a target was a web link or a network link which would be used to initiate a communication session with the server and by requesting a particular page, identify the particular unique systemwide identifier to be associated with the location would be understood and is contemplated as a primary embodiment of the methodology for initiating a location transmission to the server, including the necessary systemwide unique and or random identifier which did not specifically identify directly the venue or the location regarding which it was transmitted is contemplated within the scope of the present invention.

In an example where the location transmission was initiated by a browser or similar software on a customer mobile device, the extraction or identification of the customer location from the location transmission could be as simple as extracting the identifying portion from the link used as the complete identifier within the target and which has been open the communication session—again relying quickly on the example of a location transmission comprising an open network transmission to open a communication session between the customer mobile device 2 and server 1 based upon a network address or link reading as https://payserver-.com/12erQ435pz.htm, the server could extraction the unique identifier "12erQ435pz" based on straightforward parsing of the link and the network call received from the customer mobile device 2.

Sometimes it is explicitly contemplated that the extractable or parseable identifier contained within a physical identity target would be a unique link used by software on the customer mobile device 2 to initiate a communication with the server 1 regarding the particular customer location—ie. a link such as https://payserver.com/12erQ435pz.htm [this link being a randomly generated example]—where there was software on the customer mobile device 2 capable of opening a network or Internet link, such as a browser, a link such as this comprising the extractable identifier within a target could for example initiate a browser session by the customer mobile device 2 with the server 1 of the present invention which might correspond to the "payserver.com" address, and the specific unique identifier of the customer location might comprise the text "12erQ435pz". A location record within the order database could then contain the necessary additional information to map the random text "12erQ435pz" to a particular seating location and a particular POS system within a venue. The benefit of the random and unique identifiers used in the targets of the present invention, that do not directly include any venue or customer location identifying information, is that if a new target need to be deployed for example because the label was destroyed, or a hardware radio target needed to be repaired or replaced, the only change that needs to be made for the system to continue operating would be to use a new random target and to update the field in the corresponding location record in the order database to read as for example "72saWQ45py" instead of the older target identifier "12erQ435pz" and immediately any new order database lookups coming back on that new identifier went correspond to the correct venue, POS system and location details. In other cases, the information within the target and comprising the identifier might take a different form. Both such approaches are contemplated within the scope hereof. Details of the identifiers assigned to individual customer locations within the food-service venues in question would be stored in individual location records corresponding to the customer locations, in the order database 10. Using generic or nonidentifying information as the systemwide unique identifier is key to the novelty of the method of the present invention insofar as it permits for the rapid deployment and maintenance of the system and method of the present invention in various venues with no custom printed or custom manufactured physical identity targets.

Once the received identifier was extracted from the location transmission, at step 1-4, the software would conduct a lookup on the order database to locate the corresponding location record 13 in the order database 11 for each at least selected customer location using the received identifier(s) extracted from reading the targets regarding those locations by the customer mobile device and transmitted to the server in the location transmission. This is shown at step 1-5. Specifics of conduct of a order database lookup are dependent to a degree upon the data structure of the order database but will again be understood in their design and direction by those skilled in the art of order database and software design and any type of a specific software approach which resulted in the conduct of a query or lookup to identify the corresponding location record in the order database based upon the received identifier is understood to be within the scope of the present invention. The location records corresponding to each of the at least one selected customer location are the selected location records.

The selected location records 13 could be linked to the venue record 12 regarding the venue where the location were located. The venue record 12 would contain the necessary details to identify the venue-associated POS system(s) 10, in communication with the server, responsible for tracking charges regarding the selected customer location.

Based upon the selection of the location records at 1-5, the server and related software would then identify available menu items which could be selected and ordered regarding the identified selected customer locations in the venue, by conducting a query against the menu item records 14 stored within the order database 10. The menu item records 14 would contain the necessary information to link them to the appropriate venue records 12 and location records 13, as will be understood to those skilled in the art of order database design. Effectively menu item records 14 would be created in the order database 10 regarding each item it was desired to be able to order for delivery and/or payment regarding a customer location within a venue. The available menu items are the menu items corresponding to the selected menu item records, based upon the selected location records. Selection of the available menu items and menu item records is shown at step 1-6 of this Figure.

Having determined the available menu items regarding a particular location transmission, the next step in the method accomplished by the software of the server of the present invention would be to facilitate the selection of menu items for ordering by the ordering customer via their customer mobile device. The menu item details of the available menu items and selected menu item records would be transmitted from the server to the customer mobile device and the human interface of the customer mobile device will permit interaction with that information and the selection of items to be ordered. Once the customer had selected what they wanted to order regarding the at least one customer location indicated within the original location transmission, the details of the items to be ordered would be transmitted or locked back in at the server, so the remainder of the ordering and payment transaction can be completed. Facilitation of the menu selections by the ordering customer using their customer mobile device is shown at step 1-7.

Now having an indication of the available menu items which it was desired to order regarding the at least one selected customer location within the venue, the server can calculate the total payment amount due from the customer regarding those items—effectively prepaying for the items in a single ordering and payment transaction is the simplest and quickest method contemplated to facilitate these business transactions between customers and use calculation of the total payment amount due is shown at 1-8. The total payment amount calculated could then be displayed to the customer by the human interface of the customer mobile device, and the customer would provide their customer payment method details to the server by transmitting the payment method details regarding which they want to process payment for their food service transaction to the server in their browsing session or communication session between local software on their customer mobile device and the server. Provision of payment method details from the customer mobile device to the server is shown at step 1-9. In some embodiments of the system and method of the present invention, the customer mobile device may include a specific software app or client which would store the customer payment method details and they could be encapsulated within the location transmission initially generated by the customer mobile device. Provision of customer payment method details at any point within the overarching method of the present invention is contemplated within the scope hereof. For example, where reading the physical identity target associated with a location comprises reading, extracting and activating an Internet link such as the https://payserver.com/12erQ435pz.htm example outlined above, in a browser session that could be opened regarding that link the server 1 in communication with the customer mobile device 2 could request payment method details such as credit card details or the like from the customer in a browser window and when that information was provided that can be transmitted back to the server 1 for the initiation of the payment transaction.

Many customer mobile devices 2 including smart phones such as an Apple iPhone or the like include software-based payment capabilities where a software wallet is maintained within the device allowing customers to facilitate payment for several types of commercial transactions. It is explicitly contemplated that the payment transaction initiated regarding a particular location transmission accordance with the remainder of the method of the present invention could be facilitated by the server 1, with appropriate authentication or permissions, working in conjunction with the authenticated customer mobile device 2 to facilitate an automated payment transaction in accordance with the software wallet—in the Apple iPhone example, opening the link back to the server 1 of the present invention could with the appropriate and necessary exchange of information between the server 1 and the smart phone 2 trigger an ApplePay transaction. The Apple example outlined is only one of several types of automated wallet transactions which could be used, since virtually every smart device manufacturer and others offer online or mobile electronic wallet services and several types of electronic wallet services and payment facilitation methods can be conceived operate in communication with the remainder of the software and method of the present invention to facilitate the fastest possible authorization and processing of payment in a service venue regarding one or more customer locations. All such approaches are contemplated within the scope of the present invention.

Having received the details of customer payment method at step 1-9, the server 1 can now initiate a payment transaction, shown at 1-10, using the customer payment method details received from the customer mobile device, and the necessary network address or other processing details for the venue-associated POS system 10 or its operator to which payment is to be made. The server would then initiate an ordering transaction through the associated transaction gateway 16. The specifics of handling electronic payment transactions of this nature are understood to those skilled in the art and any type of a transaction gateway 16 design or integration which allowed the server and its related software components to process payment transactions with information captured in accordance with the remainder of the method of the present invention are contemplated within the scope hereof.

Step 1-11 in this figure is a decision block in which the software of the server 1 would determine whether successful payment had been received from the customer regarding the transaction. If payment processing failed, the software in the method could be further developed to include an exception handling routine through which credit card declines etc. could be reprocessed or other workflows implemented. If the payment is determined to have been processed successfully, the server upon confirmation with the transaction gateway 16 of the success of the payment transaction would, in step 1-13, transmit the order details for the selected and now paid menu items regarding the at least one selected customer location to the menu-associated POS system in the venue regarding each menu item record corresponding to the available and selected/paid menu items. In some implementations, the order details transmitted to the venue-associated POS system 10 may include details of the total payment amount processed including discounts or gratuities, or other transaction or payment details which can be captured or facilitated by the system and method of the present invention which might need to be communicated back to the venue-associated POS system 10 suspected individual payment transactions to allow for complete reconciliation, bookkeeping. The details of the selected customer locations corresponding to each ordered and paid menu item could also be transmitted to the venue associated POS systems regarding each item ordered, so that for venues with table service or delivery the customer location information within the venue was logged along with the remainder of a food service order to allow for its delivery upon completion to the customer. In other cases, where pickup at the counter was to be facilitated or in further embodiments as outlined elsewhere herein, it may be desirable or necessary to use a customer name instead of the selected customer location for example to facilitate pickup, or several other types of order identifications and all such approaches are again contemplated within the scope of the present invention.

So long as the venue-associated POS systems 10 were capable of network communication with the server 1, no significant hardware would be required onsite within a venue to permit the practice of the method of the present invention. Sometimes the only hardware or venue specific customization required would be a hardware or software adapter or modification to be installed to permit network communication of the venue-associated POS system 10 or systems with the server. Certain venue-associated POS systems 10 may communicate using different communication protocols, authentication methods or the like, and it will be understood that the server and the remainder of the method of the present invention could be modified or customized to permit communication with venue-associated POS systems of multiple types of communication protocols and all such types of communication and necessary modification to the communication components of the software on the server under the remainder of the present invention are contemplated within the scope hereof.

Figure 3:
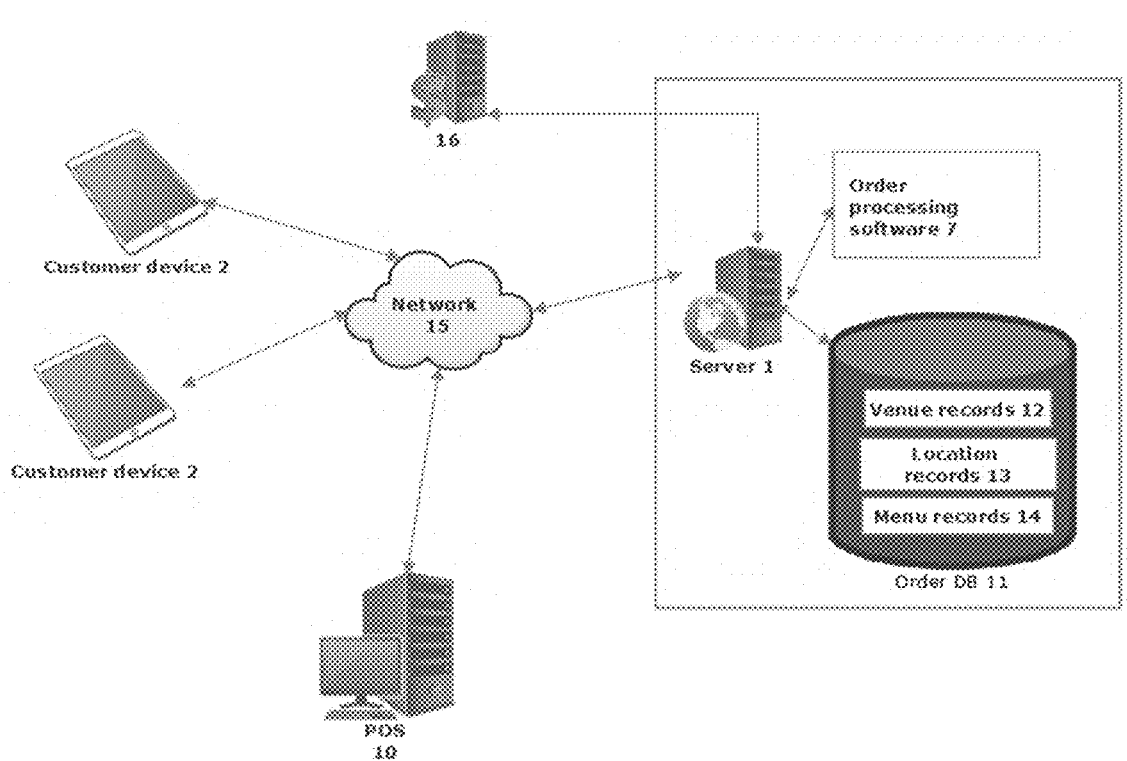
FIG. 3 is a schematic of a sample embodiment of a system under the present invention which could achieve the method outlined.
Figure 4:
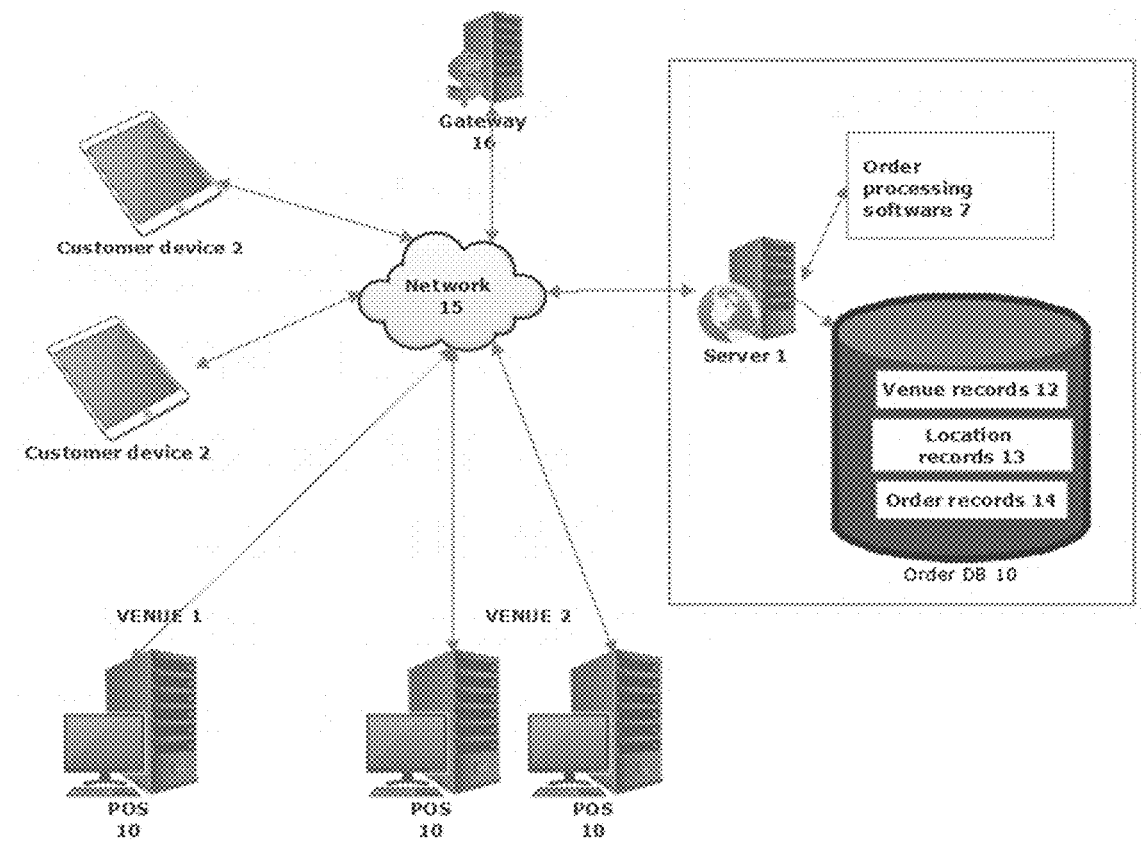
FIG. 4 is a schematic of an alternate embodiment of a system under the present invention, showing multiple food-service venues.

FIGS. 3 and 4 are block diagrams of two potential basic system architectures contemplated in conceptual embodiments of the method of the present invention. Referring first to FIG. 3 there is shown a diagram of a first potential basic system architecture of an overall number of components used for the practice of the system and method of the present invention. Server 1 is shown, with order processing software 7 in the data store 8 which contains the order database 11 and other related information. Server 1 is operatively connected via a network interface to a network 15, which also permits the server 1 communicate with the other relevant portions of the client system for transaction of the method of the present invention, including communication with a transaction gateway 16, a venue associated POS system 10, and a plurality of customer mobile devices 2. The system architecture shown FIG. 3 pertains to a single venue having a single venue associated POS system 10.

A transaction gateway 16 is shown, in network communication with the server 1 of which could actually facilitate the processing of payments to various credit cards or other payment methods under the method of the present invention. It will be understood that in some embodiments, a plurality of transaction gateways 16 might also be used depended upon the payment method type and that both such approaches are contemplated herein.

Figure 2:
FIG. 2 is a sample of a printed label which could be a physical identity target under the present invention.

The physical identity targets in the venue are not shown in this Figure but the physical identity targets corresponding to each of the customer locations within the venue will be understood from the remainder of this document. FIG. 2 is one example of a printed QR code label which could be affixed as a physical identity target in proximity to a particular customer location.

FIG. 4 shows an alternate system block diagram, similar to that of FIG. 3 except that two venues are shown, one of which venues has a single venue associated POS system 10 and the other of which shows to venue associated POS systems 10. These two system architecture diagrams are simply provided to summarize the components and system architectures contemplated in the practice of the method of the present invention. It is contemplated that one of the commercial benefits of the system of the present invention is that the provider of the payment processing method of the system of the present invention would only need to operate server 1 and its associated software components, and to provide to venues the physical identity targets for use in proximity to the customer locations. It is explicitly contemplated that the POS systems 10 within the venues would already exist and could simply be communicated with via the network 15, or by the installation of a modest network bridge hardware or the like, and even the transaction gateway 16 would likely be pre-existing or could be programmed or connected by software and hardware directly to the server 1. The rapid backward compatibility of the system and method of the present invention in a particular location-based food-service venue is one of the key aspects of the salability of the method and system outlined.

It is explicitly contemplated that the system in the method of the present invention could be delivered as a service bureau type of a product, whereby the provider of the service and infrastructure of the present method could provide service to multiple venues in multiple customers and operators of venues. It is as such explicitly contemplated that embodiments of the method and the order database of the present invention would explicitly incorporate any necessary security and other configuration to allow for compartmentalized operation and transaction processing by the system and method of the present invention on behalf of multiple customers of multiple vendors and multiple venue operators—the incorporation of such a security model to the order database and software of the present invention will be understood to those skilled in the art and is explicitly contemplated within the scope hereof as well.

Pickup or Delivery:

There are embodiments of the method of the present invention which can be envisioned which would entail delivery of ordered and paid for menu items to individual customer locations within the venue, and other embodiments which would facilitate customer attending to a pickup location to pick up their items. Both such approaches are contemplated to be covered and encompassed herein.

In an embodiment of the method such as that shown in FIG. 1, where orders for purchased menu items are transmitted to the correct menu-associated POS systems, based upon the details in the menu item records 14 in the order database 10 for the purchased menu items, the details of the transmission of the order from the server to the related POS system might include the details of the customer locations within the venue regarding which the purchased items should be prepared and delivered, and upon completion of preparing those items they could be delivered to the appropriate patients in accordance pre-existing workflows in the venue.

Delivery to a particular customer location such as this, be that a seat within a restaurant or even delivery to a seat or a seating location within a larger arena or sporting venue or the like will be understood by those skilled in the art of developing HR systems and workflows for food-service handling in such venues.

Figure 7:
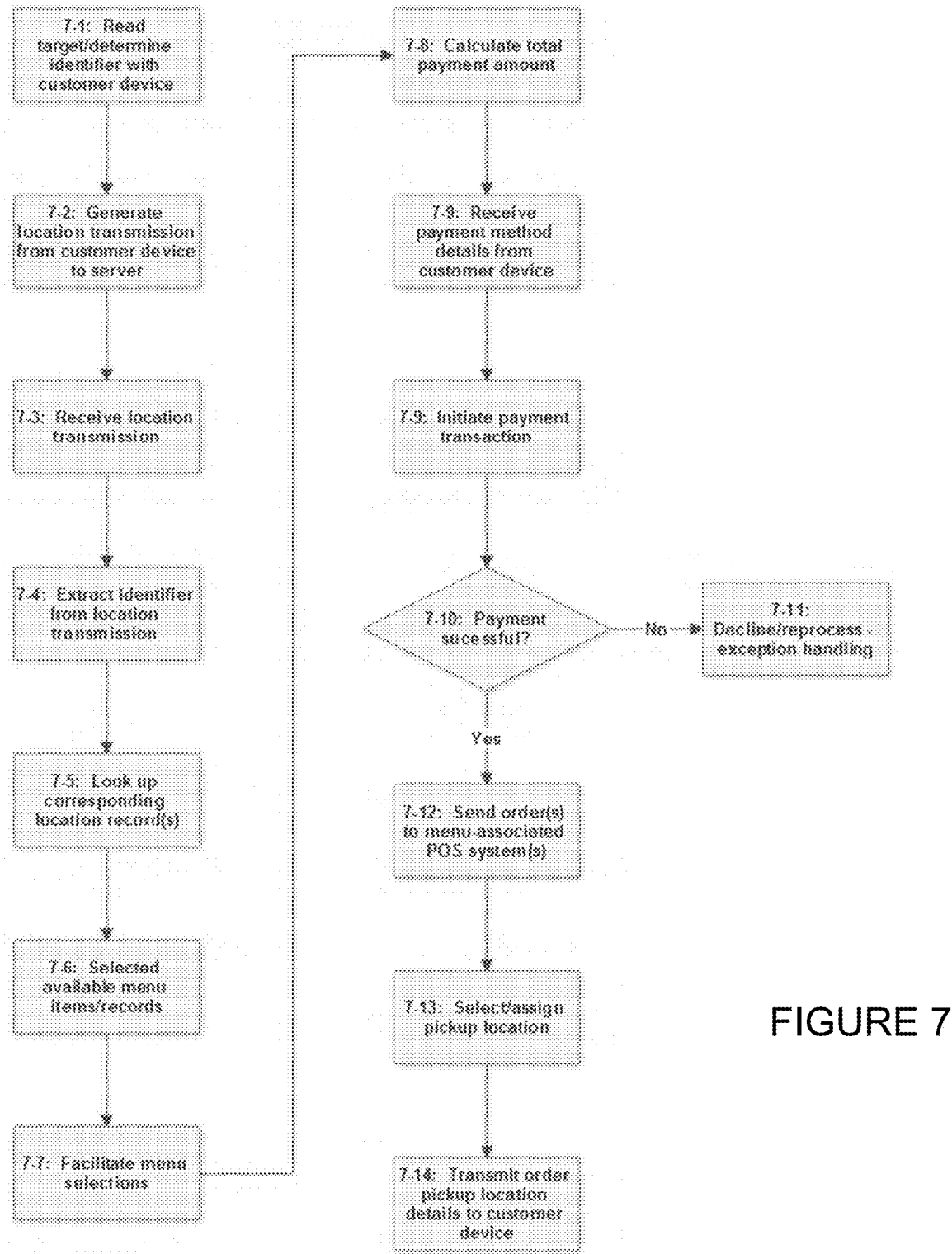
FIG. 7 is a flowchart showing the steps in an alternate embodiment of the method of the present invention, wherein the details of a pickup location are transmitted to the customer mobile device following completion of the payment transaction.

Additional embodiments, such as the flowchart in FIG. 7, are contemplated in which the system and method of the present invention would cause the preparation of purchased food-service menu items for pickup at a prescribed pickup location by the customer, rather than for delivery to the customer locations. For example in a restaurant might be desired to facilitate the ordering and payment for food items or drinks or the like which could be picked up at a particular designated location at the bar in the restaurant or something along those lines, or in stadium or arena implementations where there might be many concessions and related POS systems online and in communication with the server and involved in the method of the present invention the customer can order and pay for their food-service items from their customer mobile device and the server 1 could as part of the method transmit back to the customer mobile device and indication of the appropriate location within the venue that the customer could pick up their items upon completion or preparation—for example menu items from multiple concessions within the venue might be presented to the ordering customer via the human interface of their customer mobile device and dependent upon the location within the stadium or arena at which those food items were prepared, the server 1 could besides assigning the orders for those items to the appropriate menu-associated POS systems, displayed to the ordering customer the location of which they could pick up their items and even a map from the ordering customer location etc. many types of information on display enhancements to maximize the efficiency of the overarching system and method of the present invention will be understood and are all contemplated within the scope of the present invention.

Referring to FIG. 7 there is shown a flowchart related to a pickup, versus a delivery, embodiment of the method encompassed herein. In some implementations, the method of FIG. 7 may be accomplished with one or more additional operations not described, and/or without one or more of the operations discussed. Additionally, the order in which the operations of the method are illustrated in FIG. 7 and described below is not intended to be limiting.

The first two steps shown in this demonstrate the steps of the customer actually initiating the ordering transaction by reading the physical identity target regarding their desired customer location(s). Shown at 7-1, the customer will use their customer mobile device 2 to read the physical identity target of the method disposed at or regarding the customer location regarding which they wish to initiate an ordering transaction. Software on the device would process the information read from the target, to yield the unique system identifier of the target, and would transmit that identifier to the server of the present invention within a location transmission, shown at 7-2.

Upon receipt of a location transmission by the server, in step 7-3, the server 1 with the order processing software 7 and other components will initiate an ordering transaction. The first step in that transaction under the method will be the extraction of the identifier of the physical identity target corresponding to the selected customer location from the location transmission. This is shown at step 7-4.

Once the received identifier was extracted from the location transmission, at step 7-4, the software would conduct a lookup on the order database to locate the corresponding location record 13 in the order database 11 for each at least selected customer location using the received identifier(s) extracted from the reading of the targets regarding those locations by the customer mobile device and transmitted to the server in the location transmission. This is shown at step 7-5. Specifics of conduct of a order database lookup are dependent to a degree upon the data structure of the order database but will again be understood in their design and direction by those skilled in the art of order database and software design and any type of a specific software approach which resulted in the conduct of a query or lookup to identify the corresponding location record in the order database based upon the received identifier is understood to be within the scope of the present invention. The location records corresponding to each of the at least one selected customer location are the selected location records.

The selected location records 13 could be linked to the venue record 12 regarding the venue where the location were located. The venue record 12 would contain the details to identify the venue-associated POS system(s) 10, in communication with the server, responsible for tracking charges regarding the selected customer location.

Based upon the selection of the location records at 7-5, the server and related software would then identify available menu items which could be selected and ordered regarding the identified selected customer locations in the venue, by conducting a query against the menu item records 14 stored within the order database 10. The menu item records 14 would contain the necessary information to link them to the appropriate venue records 12 and location records 13, as understood to those skilled in the art of order database design. Effectively menu item records 14 would be created in the order database 10 regarding each item it was desired to order for delivery and/or payment regarding a customer location within a venue. The available menu items are the menu items corresponding to the selected menu item records, based upon the selected location records. Selection of the available menu items and menu item records is shown at step 7-6 of this Figure.

The menu item details of the available menu items and selected menu item records would be transmitted from the server to the customer mobile device and the human interface of the customer mobile device will permit interaction with that information and the selection of items to be ordered. Once the customer had selected what they wanted to order regarding the at least one customer location indicated within the original location transmission, the details of the items to be ordered would be transmitted or locked back in at the server, so the remainder of the ordering and payment transaction can be completed. Facilitation of the menu selections by the ordering customer using their customer mobile device is shown at step 7-7.

The server can calculate the total payment amount due from the customer regarding those items—shown at 7-8. The total payment amount calculated could then be displayed to the customer by the human interface of the customer mobile device, and the customer would provide their customer payment method details to the server. Provision of payment method details from the customer mobile device to the server is shown at step 7-9.

Having received the details of customer payment method at step 7-9, the server 1 can now initiate a payment transaction, shown at 7-10, using the customer payment method details received from the customer mobile device, and the network address or other processing details for the venue-associated POS system 10 or its operator to which payment is to be made.

Step 7-11 in this figure is a decision block in which the software of the server 1 would determine whether successful payment had been received from the customer regarding the transaction. If payment processing failed, the software in the method could be further developed to include an exception handling routine through which credit card declines etc. could be reprocessed or other workflows implemented. If the payment is determined to have been processed successfully, the server upon confirmation with the transaction gateway 16 of the success of the payment transaction would, in step 7-13, transmit the order details for the selected and now paid menu items to the associated POS systems. The menu-associated POS system for each menu item would be stored within the menu item record 14 in the database 11 and would be one of the venue associated POS systems detailed in the related venue record 12. By transmitting the order details to these POS systems, the actual preparation of the requested service items or food items could be commenced.

The difference in the embodiment of the method of this Figure is this particular method outlined in this Figure anticipates a pickup methodology by the customer rather than delivery of the ordered food items to a particular selected customer location. Insofar as the method contemplates a pickup method rather than the delivery method, the transmission of order details to the menu associated POS systems might include details of the selected customer locations, which could identify the transactions or to identify the orders for pickup by the customer, or other information identifying the ongoing customer could be used in the place of the details of the selected customer location from a related location record. Both such approaches are contemplated herein.

The server 1 and the related software 7 could, at the time of dispatch of the order details for the paid for and selected menu items to the appropriate menu associated POS system or systems within the venue, assign a pickup location for the order, at which the ordering customer could pick up their items when prepared. The system could store a list of potential pickup locations associated with each POS system or associated with the venue, and could as outlined elsewhere herein use multiple selection approaches to assign the most efficient pickup location for the ordering customer to pick up their order. The selection or assignment of a pickup location is shown at step 7-13. The server could then transmit the details of the assigned order pickup location to the customer mobile device for display, shown at step 7-14, so the customer knew where to pick up their items. As described elsewhere above, it is explicitly contemplated that the pickup methodology would be particularly useful in the deployment of the server and the method of the present invention in a large-scale sporting venue or the like were there could be literally tens of thousands of customer locations, as well as dozens of food-service locations or POS systems regarding which orders could be received and processed. Assigning an order to the most efficient location from which a particular type of menu item can be obtained is another patentable aspect of the method of the present invention. For example, in a stadium having 50 different food outlets each comprising one or more venue associated POS systems, if a particular menu item represented by a menu item record 14 in the database 11 was only available at seven outlets, the necessary information could be stored in relation to the menu item record 14 to permit the server 1 of the software 7 to select the closest physical outlet or POS system to a particular customer location selected by an ordering customer in initiating a transaction, and that might be where they would be instructed to pick up their order. The order could also be split into multiple pickup locations where different POS systems are outlets within such a large venue could vend different items.

So long as the venue-associated POS systems 10 were capable of network communication with the server 1, no significant hardware would be required onsite within a venue to permit the practice of the method of the present invention. Sometimes the only hardware or venue specific customization required would be a hardware or software adapter or modification to be installed to permit network communication of the venue-associated POS system 10 or systems with the server.

In further embodiments similar to that of FIG. 7, where multiple concessions within a particular menu could produce or prepare a particular type of menu item, server 1 and the software 7 could select the closest concession and menu-associated POS system 10 to the selected customer location in question and assign the order in preparation of the particular ordered menu items there, for pickup there as well. Further enhancement of the method of the present invention in systems and server implementations related to venues with multiple POS systems and even multiple food preparation areas to, based upon additional intelligence or algorithmic preparation, assign particular food orders to the most efficient, closest located or best suited concession and/or related menu-associated POS system are also contemplated within the scope hereof.

Identity Targets:

As outlined in further detail elsewhere herein, each customer location within a location-based food-service venue operating under the method of the present invention would have a physical identity target attached in proximity thereto. This would either be a label or even a electronic video display capable of displaying a QR code, barcode or some other machine-readable indicia corresponding to an identifier of the customer location which could be scanned or read visually by a customer mobile device using a camera and related software application, or in other embodiments the physical identity target could be a short-range radio beacon, NFC or RFID tag or the like capable of broadcasting or communication with a radio receiver in the customer mobile device and capable of transmitting data which could be processed or have data corresponding to an identifier of the customer location extracted therefrom when read by a reader or receiver on a customer mobile device. Other physical identity targets could provide more than one means of acquisition of the unique identifier of the target i.e. they might include a barcode or QR code for scanning, along with the radio beacon, to maximize the number type of client devices 2 which would be capable of reading target. All such approaches are contemplated within the scope of the present invention.

FIG. 2 shows a sample of a printed label which might be used as a physical identity target attached in proximity to a particular customer location in a food-service venue. The label 1 includes a QR code 2 which comprises the necessary information to initiate a location transmission regarding the particular assigned customer location. The QR code 2 or similar information to be read from a target may also include a web link, or other network or server address, which could be used by software on the customer mobile device to address the location transmission to the appropriate server.

As outlined throughout this document, the physical identity target might comprise a fixed static label which could be visually scanned using the camera of a customer mobile device 2 or a similar approach to initiate a location transmission in relation to the remainder of the method of the present invention, or in other cases, the physical identity target is explicitly contemplated to comprise a low-power radio beacon or the like—for example NFC or RFID readable tags, beacons or the like, a Bluetooth device or something similar with a hardware readable or broadcasting target device being used, any type of a device which could be encoded with a unique systemwide identifier under the remainder of the method of the present invention, either statically or dynamically wearing it could be updated or changed as desired, are all contemplated within the scope of the present invention.

With a visual display or network communicating radio beacons or the like, dynamic identifiers could even be used, whereby the identifier could be changed occasionally if required. Either statically printed or configured physical identity targets, or identity target hardware permitting the use of dynamic identifiers are both contemplated within the scope of the present invention.

Any type of an identity target which can be used with the remainder of the method of the present invention is contemplated herein. It is also contemplated that in some embodiments of the method of the present invention, more than one type of identity target could be used in a single venue installation—for example certain customer locations might require the use of a printed tag with a barcode or the like, where other locations in the same venue might use beacons, RFID tags or the like. Again a blending of identity target technology within a particular food-service venue is contemplated within the scope hereof.

Identifiers:

The actual identifier of a particular customer location within a food-service venue encoded within the physical identity target is contemplated to be either a random or serial systemwide unique identifier. The identifier would include no specific information that identified either the venue or the customer location—it would simply be a generic identifier which could be used in a lookup in a order database on the server to identify a corresponding location record in the order database. Using identifiers which include no specific information identifying the venue or the customer location is a specific patentable element of the system and method of the present invention—this will permit the use of generically printed or generically configured labels, beacons or other hardware in the installation of the system the present invention in a particular location-based food-service venue, with no custom printing. This will enhance the speed of installation and making maintenance way cheaper and quicker since custom printing of individual replacement labels or custom configuration of individual replacement beacon or target hardware will not be required. Use of generic non-identifying targets and identifiers would permit the use of a basic software application to allow for on-site configuration and maintenance of the system in and after installation.

It is contemplated that the physical identity targets, insofar as they display the identifiers for acquisition by customer mobile devices regarding particular customer locations, would not even need to include any human readable indicia regarding the identifier, since it is explicitly contemplated that the system and method of the present invention would only be practice based upon machine reading of the identity target.

Sometimes it is explicitly contemplated that the extractable or parseable identifier within a physical identity target would be a unique link which would be used by software on the customer mobile device 2 to initiate a communication with the server 1 regarding the particular customer location—ie. a link such as https://payserver.com/12erQ435pz.htm [this link being a randomly generated example]—where there was software on the customer mobile device 2 capable of opening a network or Internet link, such as a browser, a link such as this comprising the extractable identifier within a target could for example initiate a browser session by the customer mobile device 2 with the server 1 of the present invention which might correspond to the "payserver.com" address, and the specific unique identifier of the customer location might comprise the text "12erQ435pz". A location record within the order database could then contain the necessary additional information to map the random text "12erQ435pz" to a particular seating location and a particular POS system within a venue. The benefit of the random and unique identifiers used in the targets of the present invention, that do not directly include any venue or customer location identifying information, is that if a new target need to be deployed for example because the label was destroyed, or a hardware radio target needed to be repaired or replaced, the only change that needs to be made for the system to continue operating would be to use a new random target and to update the field in the corresponding location record in the order database to read as for example "72saWQ45py" instead of the older target identifier "12erQ435pz" and immediately any new order database lookups coming back on that new identifier went correspond to the correct venue, POS system and location details. In other cases, the information contained within the target and comprising the identifier might take a different form. Both such approaches are contemplated within the scope hereof. Details of the identifiers assigned to individual customer locations within these food-service venues would be stored in individual location records corresponding to the customer locations, in the order database 10. Using generic or non-identifying information as the systemwide unique identifier is key to the novelty of the method of the present invention insofar as it permits for the rapid deployment and maintenance of the system and method of the present invention in various venues with no custom printed or custom manufactured physical identity targets.

Venue-Associated POS Systems:

It is specifically contemplated that the method of the present invention can be practiced in conjunction with pre-existing venue-associated POS systems 10 in various location-based food-service venues. For example if the food-service venues are hospitality establishments—restaurants and bars or the like—pre-existing POS systems exist which allow for the charging and tracking of charges against individual customer locations within the venue. Many of these venue-associated POS systems 10 already permit for an Internet or network interface to allow for credit card processing or the like, so adaptation of the network interface on the venue-associated POS system 10 to permit exchange of information between the venue-associated POS system 10 and the server of the present invention could be achieved often with simple software modification or opening of a communication channel between these devices. In other systems, a modest hardware interface might need to be installed on site to permit communication between older pre-existing POS systems without the same network communication capabilities, and the server.

Certain venue-associated POS systems are already operatively connected to a centrally based vendor cloud or vendor order database or collection system which might also permit a simple API lookup or API communication between the server of the present invention and the pre-existing network backend of the venue-associated POS systems. Any type of a communication conduit which can be created between the vendor-based POS systems within a particular location-based food-service venue and the server of the present invention will all be understood to be contemplated within the scope of the present invention.

As outlined in further detail elsewhere herein, some food-service venues may have more than one POS system 10 located therein, with each POS system 10 responsible for charging or tracking regarding a certain subset of the customer locations in the venue. Modifications can be made to the order database and the location records tracked regarding individual customer locations to permit proper communication or queries in lookups regarding an individual customer location within the venue and processing of payment transactions in respect thereof.

Figure 5:
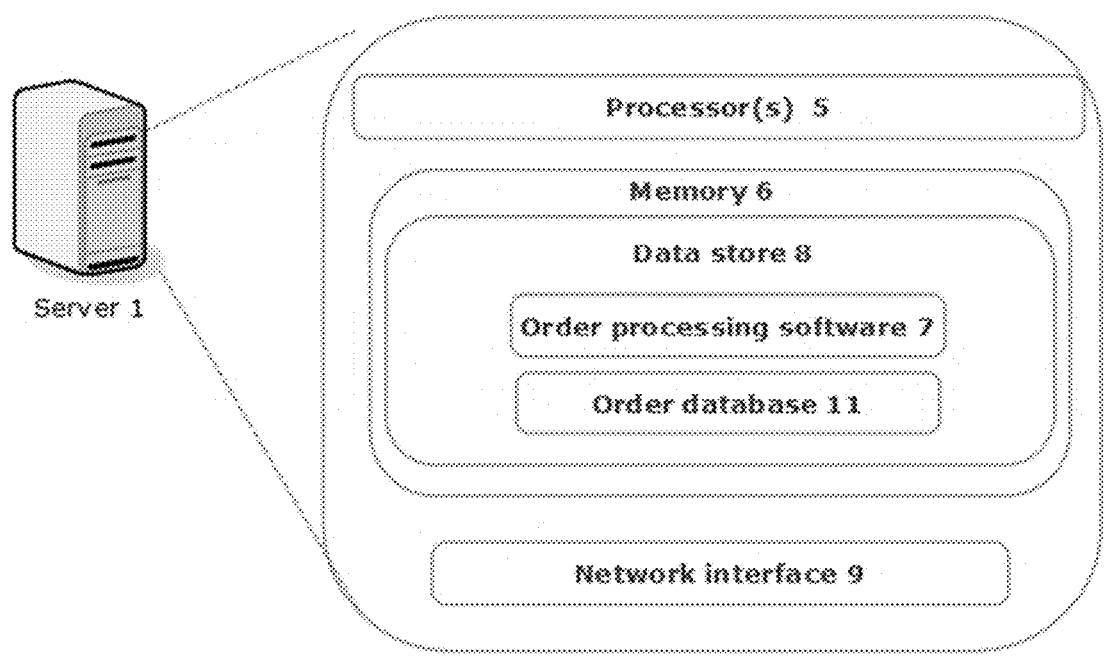
FIG. 5 is a block diagram showing the components of a server under the present invention.

Server Architecture:

The method of the present invention and the overall architecture would be client/server in nature and would rely on a server 1 configured for the processing of payments for at least one location-based food-service venue containing a plurality of customer locations and at least one network-connected venue-associated POS system 10, wherein each customer location has a physical identity target attached in proximity thereto comprising a unique system-wide identifier readable by customer mobile devices, under one or more implementations. The server 1, a sample embodiment of which is shown in FIG. 5, might consist of one or more servers 1—a single server or a server farm approach. The server 1 would comprise one or more processors 5 and memory 6. The memory 6 might contain various software components or processor instructions for the method of the present invention or otherwise in operating the server 1. Processor instructions corresponding to the order processing software component are shown stored within the memory 6 in this Figure.

Server(s) 1 may be configured by machine-readable instructions, which may include one or more instruction modules. The instruction modules may include one or more of server firmware or operating systems, the order processing software 7, and/or other instruction modules.

Memory 6 may comprise non-transitory storage media that electronically stores information. The electronic storage media of memory 6 may include one or both of system storage provided integrally (i.e., substantially non-removable) with server(s) 1 and/or removable storage that is removably connectable to server(s) 1 via, for example, a port (e.g., a USB port, a firewire port, etc.) or a drive (e.g., a disc drive, etc.). Memory 6 may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 6 may include one or more virtual storage resources (e.g., cloud storage, a virtual private network, and/or other virtual storage resources). Memory 6 may store software algorithms, information determined by processor(s) 5, information received from server(s) 1, information received from client devices 2, and/or other information that enables server(s) 1 to function as described herein.

Processor(s) 5 may be configured to provide information processing capabilities in server(s) 1. Processor(s) 5 may include one or more of a digital processor, an analogue processor, a digital circuit designed to process information, an analogue circuit designed to process information, a state machine, and/or other mechanisms for electronically processing information. Although processor(s) 5 is shown in FIG. 5 as a single entity, this is for illustrative purposes only. In some implementations, processor(s) 5 may include a plurality of processing units. These processing units may be physically within the same device, or processor(s) 5 may represent processing functionality of a plurality of devices operating in coordination.

In many embodiments, the server 1 is contemplated to be a Web server, where client devices 2 would use a web browser for interaction therewith. Where a local app was developed, server 1 might not be a Web server per se but might be a server 1 capable of interaction with the type of an interface on remote client devices. Either such approach is contemplated within the scope hereof.

Server 1 would host or be operatively connected to the data store 8. Besides the general operating system instructions the server 1 would comprise a order processing software component 7 which would be responsible for execution of the method of the present invention at the server and coordinating the communication with customer mobile devices 2 of customers. The order processing software component 7 might itself act as the interface between the remainder of the hardware and software of the server 1 and the data store, or the server 1 might include additional software interfaces to the data store 8.

The order processing software component 7 would comprise subroutines to administer the data store, creating, modifying and processing payment transactions and records in the data store, and additional financial or numerical transactions, searches or reporting as required. The details of operating the order processing software component 7 are outlined elsewhere herein.

Server 1 also requires integration or connection of a transaction gateway 16, to facilitate the remainder of the method. Some embodiments of the method of the present invention might comprise the incorporation of the additional hardware and software components within server 1 and its associated hardware and software to allow the server 1 itself to act as a transaction gateway to process payment transactions directly regarding method transactions being executed under the remainder of the method, to the payment methods or credit cards of customers, and crediting the amounts recovered back to the vendors. Where in certain cases the transaction gateway software and hardware would be operated as a component of the server 1, in other cases, the server 1 might be connected via its at least one network interface to externally provided transaction gateways in both such approaches are contemplated within the scope of the present invention. The design of a transaction gateway and communication between the transaction gateway 16 in the server 1 of the present invention will be understood to those skilled in the art of developing POS and e-commerce systems and all such approaches are contemplated within the scope of the present invention.

Server 1 would also include at least one network interface 9 via which one could communicate with the at least one communications network to enable communication with the venue-associated POS systems on the customer mobile devices of the remainder of the method as outlined herein. It will be understood by those skilled in the art of network design and hardware and software design that certain server architectures might include more than one network interface 9 and any type of a server 1 and network interface 9 design which enabled the communication of the server 1 the at least one data network outlined in the remainder of the method would all be contemplated within the scope of the present invention.

Order Database Design:

In the architecture shown, there is shown a data store 8 operatively connected to the remainder of the server 1 which contains the various required data for operating the method of the present invention. Any type of a data structure capable of storing the information for the required data subsets in respect of venues, locations and purchase transactions are contemplated herein. The data store 8 might be resident on the server 1, or might be located and administered remotely and operatively connected with the server 1 via a network or other communications bus.

The one effective data structure required to facilitate the practice of the method of the present invention, in operable connection to the server 1, is a order database 11. The order database would include the information for the practice of the method of the present, including a venue record 12 corresponding to each location-based food-service venue. The venue record 12 for a venue would include the necessary venue payment details used to process payments to that vendor or its operator on the one or more transaction gateways integrated or operatively connected to the server 1. The venue record 12 for a particular venue would also include any necessary network address details or other communication requirements to allow for the communication of the server 1 with each venue-associated POS system 10. Different venues may include different POS systems 10 some of which communicate using different communication protocols, where different security credentials of the like, and all of the necessary information to identify and allow the server 1 and the associated order processing software component 7 to configure itself to communicate with those POS systems 10 or regarding transactions with transaction gateways in that regard is all contemplated to be within the scope of the information which could be designed into the data structure of the venue record 12.

The order database 11 would also include a location record 13 regarding each physical customer location in each managed venue. The location record 13 would contain the information to match the physical identity target in proximity to, or regarding, the particular customer location within the venue—for example in a hospitality venue this could be a particular seat or table or the like—to a particular "charging location" within a venue-associated POS system 10. For example, a venue-associated POS system 10 in a hospitality establishment would contain the software and records to allow for food and beverage orders to be placed in the system 10 regarding individual seating or table locations within the establishment, which individual seating or table locations would comprise individual customer locations in the context and lexicon of the present invention. Use of the location records 13 to match the generic and non-location identifying identifiers regarding each physical identity target used in one or more venues, with the key or identifying information to properly identify each physical customer location in the associated venue-associated POS system 10, thus removing the need to use location identifying information within the identifier encoded within the physical identity target regarding each customer location is the key aspect of the present method. Design of an appropriate record structure in the order database 11 to record the look up information to match the targets with the locations will be understood to those skilled in the art of software and order database design and any type of an approach that achieves the subjective of providing location records 13 within the order database 11 which would allow for lookup and matching of the customer locations within a venue to the physical identity targets and their encoded identifiers used are contemplated within the scope of the present invention.

There may be additional information encoded within the location records 13 for individual customer locations with the venue as well where for example more than one venue-associated POS system 10 is used in a particular venue—it may be necessary to provide or save regarding each location record 13 necessary additional order database keys or information to properly match or correspond lookups are charging regarding a particular customer location within the venue with the proper affiliated POS system 10.

Besides the venue records and the location records, the database 11 would also include a plurality of menu item records 14, each corresponding to a menu item which it was possible to order or purchase in a venue. The menu item records 14 would include an item identifier along with restricting information related to the venues in which the particular item was available or even some groupings of locations within venues which could be imposed upon particular menu items, and menu item details related to the description, the pricing etc. and a POS system identifier for the menu associated POS system within the venue regarding which orders for that item within the venue should be posted or transmitted.

It is contemplated that the software of the server 1 may include a module or an interface permitting the installer of a system in accordance with the method of the present invention, or the vendor/operator of a venue, to quickly create or maintain the lookup location records 13 and to adjust or create the necessary records to match up individual deployed physical identity targets with locations within the menu. Quickly interfacing this will allow for the quick deployment and replacement of physical identity targets where replacement or repairs required, or new locations are categorized or required to be added to the system. Provision of a software interface permitting an administrative user to administer the location records 13, or even the venue records 12 within the order database, will be understood to those skilled in the art of order database design as well and will also be understood to be contemplated within the scope of the present invention.

Figure 6:
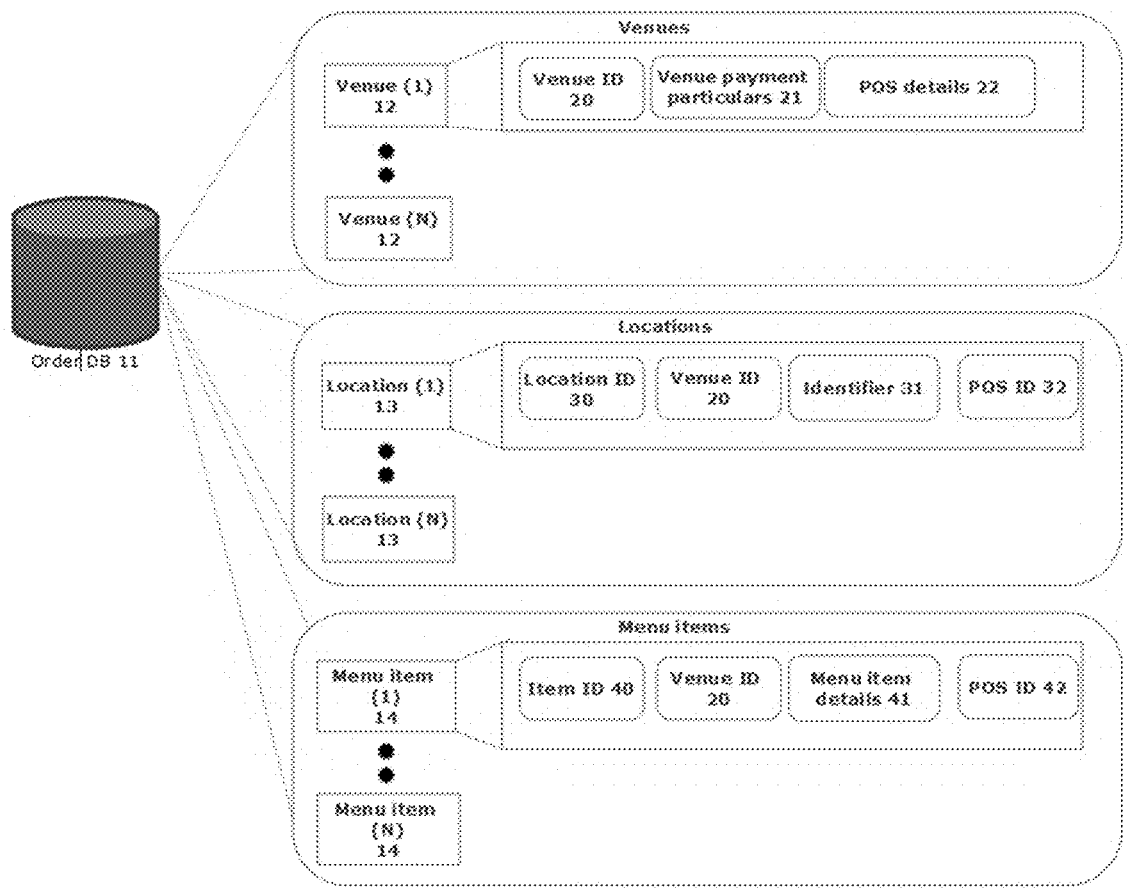
FIG. 6 is a sample schematic drawing of one data structure for the order database under some embodiments of the present invention, demonstrating the key components of the anticipated record structure.

FIG. 6 shows a sample data structure of the order database 11 under one embodiment of the present invention, simply to demonstrate type of data structure elements contemplated to be used in many embodiments of the method outlined a plurality of venue records 12 and a plurality of location records 13 are shown. A venue record 12 would exist in the order database 11 regarding each venue 10 regarding which the method was to be administered. Regarding the venue records 12 shown, there is shown a record key being a venue identifier 20, which from the order database and record identifying perspective would be understood to those skilled in the art of order database design. Besides the venue ID 20 there is also shown payment particulars 21 stored in the venue record 12. The payment particulars 21 would comprise the information to be used to process payments for transactions within the venue and appropriately route the recovered payment amounts and funds to the operator or vendor of that venue. Also shown are POS system details 22. The POS detail 22 would be any necessary information required for the server 1 to communicate with each venue associated POS system 10 within the venue. This might comprise network addresses, security or authentication credentials or the like. Again the rough structure of this record and order database is shown in this Figure simply to demonstrate the nature of a basic record structure contemplated and it will be understood that several other architectural approaches could be taken to a order database 11 and the information required to administer the method of the present invention without departing from the desired scope and intention thereof.

Also shown are a plurality of location records 13. A location record 13 would be created for each customer location within each venue, so the location record 13 would correspond to a physical identity target attached in proximity to a customer location such as, in the example of a hospitality installation at particular seat or table regarding which POS billing might be desired to be tracked and subsequently paid under the method of the present invention. The architecture of the location records 13 could also accommodate the ability for a location transmission from a customer mobile device 2 the seat to initiate a transaction payment regarding multiple customer locations in a venue simultaneously. All such approaches are contemplated within the scope of the present invention.

Regarding the location records 13 shown, there are a plurality of location records 13 corresponding to the total number of billing locations within the total number of venues administered under the system. Obviously different architectural approaches could be taken to the completion or delivery. As shown, there is a record key or a location ID 30 which will be understood to those skilled in the art. Each location record 13 would in the data structure of the order database 11 be cross-referenced to its location record 11, as shown by the corresponding venue ID 20 in each location record 13 as shown. The other key information to be tracked within each location record 13 would be the unique non-location identifying identifier associated with that customer location within the venue—the identifier is shown at 31. The identifier 31 is the information used to initiate an ordering transaction under the remainder of the present invention by extraction of the identifier 31 from the scandal or reading of the physical identity target regarding the particular location by a customer mobile device 2.

Also shown is a POS ID 32. The POS ID 32 would be any necessary information required to relate the particular physical customer location within the venue, regarding which the location record corresponds, to a particular POS system and POS location within the venue. The POS ID 32 would be any necessary address or link information which could be used in communication with the associated POS system to identify the corresponding customer location as tracked within the POS system—for example each customer location within a venue containing one or more POS systems would already have an identifier be that a table number, seat number or the like assigned regarding the location and is used to track and generate POS billing. The POS ID 32 stored within the location record 13 would be any necessary information to cross-reference the POS bill in association of the location on the appropriate venue associated POS system to the physical identity target identified in the record 13. For example in a venue having more than one venue associated POS system 10, it might be necessary to identify which POS system tracked and billed regarding the particular customer location. As well, that POS ID 32 might actually include the seat number or other type of a system address used by the venue associated POS system in question to identify the particular billing record within that related POS system from which the billing amount related to the particular customer location can be identified for billing and payment purposes. The POS ID 32 might represent any necessary information which could communicate with an appropriate venue associated POS system 10 the purpose of identifying the amount of an ordering transaction required to clear the POS billing regarding that customer location in the venue.

Additional information related to the location subject of the location record 13 could also be stored. This might include other field information for display on reports or other information which might be required for the method of the present invention or other POS for tracking purposes.

A plurality of menu item records 14 are also shown. Each menu item record 14 would correspond to a menu item which could be ordered within a venue to a particular customer location.

As shown in this Figure, the record 14 would include an item identifier 40 or other type of a database key, and any venue identifier 20 or other limiting restriction upon the venues or locations regarding which the particular menu item could be presented as an available menu item for selection and ordering. For example, we menu items and their related menu item records 14 would not be used across venues, so a venue identifier restriction 20 such as shown in this Figure might be relevant, but it may also be the case that particular areas within a particular venue may also have only access to particular menu items and the related menu item records 14—for example in a larger stadium type implementation of the system and method of the present invention there may be a VIP menu only available in certain areas of the stadium and not others, as an example. Besides the item ID 40 and the venue ID 20, there is also shown the menu item details 41 which beat the price, description, imagery etc. which might all be used to display an appropriate menu display of available menu items to a ordering customer via the human interface of their customer mobile device to make order selections. Several types of menu item details 41 could be stored within the record 14 and all are contemplated within the scope hereof.

Finally, in some or all embodiments of the database 11 it may also be desirable to include a POS system limiter or identifier 42 regarding a particular menu item record 14. This would signify the "menu-associated POS" for that menu item, if a venue had more than one venue associated POS system operational and orders for certain menu items represented by certain menu item records 14 need to be routed to a particular one of the venue associated POS systems. In other embodiments of the database had the method of the present invention, a menu item might be available regarding more than one of a plurality of venue associated POS systems 10 and so a similar database field as shown regarding element 42 might include addresses or details of multiple POS systems which could handle or process orders for this menu item.

The particular construction or data structure of the data store and individual data stored might also depend on the infrastructure design of the remainder of the system of the present invention. Again, the various aspects of the system, its structure and order database design will be understood to those skilled in the art of relational order database and client/server system design and are all contemplated within the scope of the present invention.

Communications Network:

It is specifically contemplated that the communications network which would be used for communication between the server 1 and the customer mobile devices 2 of customers would be the Internet or another publicly available wide area network. The removal of a requirement for a proprietary or closed communications network between remote venue-associated POS systems 10, customer mobile devices 2 and the server 1 facilitating the method represents one significant enhancement and cost efficiency of the method of the present invention. The specific protocol of communication between the various devices could vary, and differing communication protocols could be used between different devices in the system—all such approaches and architectures will be understood to those skilled in the art of wide area computer network design and all such approaches are contemplated within the scope of the present invention. In certain embodiments of the system and method of the present invention more than one communications network might be used.

The server 1, customer or client devices 2, and any venue-associated POS systems 10 would need to each comprise a network interface capable of communicating with the at least one communications network contemplated within the scope of the remainder of the present invention. It is explicitly contemplated that the wide availability of Internet connectivity would cause the best, simplest and most cost-effective network communications infrastructure to effectively implement the method of the present invention, although it will be understood that private networks could also be used albeit with the added cost and complexity in terms of client software for communication. Both such approaches are contemplated within the scope of the present invention. Also contemplated is a scenario in which more than one communications network was used i.e. one communications network and a first network interface on the server 1 might occasionally customer mobile devices 2, and a separate interface and or network might facilitate communication between the server 1 of the present invention and the venue-associated POS systems 10.

Customer Mobile Devices:

The method of the present invention explicitly contemplates the use of network enabled customer mobile devices 2 by customers to initiate purchase transactions under the remainder of the method. It will be understood by those skilled in the art of client/server application design that any type of a device which could communicate with the server 1 via a network and the related network interface would be within the scope of the present invention. Smart phones, PCs and other remote and network capable computing devices are all devices understood to be contemplated within the scope of the present invention, insofar as they would each include a network interface by which the customer mobile device 2 could communicate via a data network with the server 1. The majority of these types of commercially available hardware devices would already include all the necessary hardware and software components to participate in the method of the present invention. It will be understood by those skilled in the art of client/server remote application deployment that any type of a computing device capable of interaction with the server 1 and any other remainder of the system of the present invention and to interact with the server 1 of the remainder of its components by the network are contemplated within the scope of the present invention.

It is contemplated that the ideal customer mobile device 2 would be a smart phone with a camera, since a smart phone with a camera and associated software would be capable of reading QR codes and other similar types of physical identity targets for use in accordance with the present invention. Many smart phones also include Bluetooth, RFID or NFC readers all of which could read other types of physical identity targets.

The customer mobile device could include pre-existing software, such as scan reading software and a browser for example, which could facilitate the method of the present invention, or in other cases, specific purpose built client software could be used. Architecturally and conceptually, the concept of "apps" used on smart phones and other personal devices as a front end to centrally hosted systems is widely known. Where an interface is provided on the customer mobile device 2, the user of the customer mobile device 2 could interact with the system and the server 1 of the present invention by sending and receiving information between the interface of the customer mobile device 2 and the server using Internet communication protocols or the like between the customer mobile device 2 and the server 1. The specifics of implementing the client/server software system using a website or at a central bureau and an interface on the customer mobile device will be easily understood by those skilled in the art of client/server software design and the method of implementation of such a similar approach is contemplated within the scope of the present invention.

Conceptually the use of a local app as the front end or interface to the server of the present invention, is at least as likely as the possibility of using a browser to facilitate the use of the method of the present invention. Development of either a browser interface or a local app interface as the user interface between the customer at the customer mobile device 2 and the server 1, and the remainder of the centrally located method and architecture of the present invention, will be understood to those skilled in the art of client/server order database and application design and all such approaches are contemplated within the scope of the present invention.

Although the present technology has been described for illustration based on what is currently considered the most practical and preferred implementations, it is to be understood that such detail is solely for that purpose and that the technology is not limited to the disclosed implementations, but, on the contrary, should cover modifications and equivalent arrangements within the spirit and scope of the appended claims. For example, it is to be understood that the present technology contemplates that, to the extent possible, one or more features of any implementation can be combined with one or more features of any other implementation.

In addition, it will be apparent to those of skill in the art that by routine modification the present invention can be optimized for a wide range of conditions and application. It will also be obvious to those of skill in the art there are various ways and designs with which to produce the apparatus and methods of the present invention. The illustrated embodiments are therefore not intended to limit the invention, but to provide examples of the apparatus and method to enable those of skill in the art to appreciate the inventive concept.

The invention claimed is:

1. An ordering method for use in a plurality of location-based food-service venues each containing a plurality of customer locations and at least one network-connected venue-associated POS system, wherein each customer location in a food service venue has a physical identity target attached in proximity thereto, wherein each physical identity target displays a unique non-locationally associated identifier readable by customer mobile devices and wherein the unique non-locationally associated identifier is selected from the group of printed QR codes or printed bar codes, the method comprising:
   a) placing a first physical identity target at a first customer location, wherein the first physical identity target comprises a first unique non-locationally associated identifier;
   b) providing a server including an order processing software component, a network interface capable of two-way communication via at least one data network with customer mobile devices as well as with all of the venue-associated POS systems, a transaction gateway through which customer payments can be processed, and an order database comprising:
      i) a venue record corresponding to each location-based food-service venue and containing venue payment details via which payments to the venue can be electronically processed by the transaction gateway and network address details for each venue-associated POS system by which the server can communicate with same;
      ii) a location record corresponding to each physical customer location in each managed venue and containing the first unique non-locationally associated identifier of the first physical identity target and identification of a venue-associated POS system affiliated with the customer location; and
      iii) a menu item record corresponding to each menu item which can be ordered within a venue including purchase information in respect of the menu item and identification of a menu-associated POS system being the venue-associated POS system to which orders for the menu item should be transmitted;
   c) replacing the first physical identity target with a second physical identity target at the first customer location, wherein the second physical identity target comprises a second unique non-locationally associated identifier;
   d) updating the location record to replace the first unique non-locationally associated identifier with the second unique non-locationally associated identifier; and
   e) processing ordering transactions by customers in respect of at least one selected customer location, using the server and the order processing software component in communication with the customer mobile device of an ordering customer to: processing ordering transactions by customers in respect of at least one selected customer location, using the server and the order processing software component in communication with the customer mobile device of an ordering customer to:
      i) receive at the server a location transmission containing the second unique non-locationally associated identifier of the second physical identity target associated with the at least one selected customer location from the customer mobile device having read and captured the second unique non-locationally associated identifier;
      ii) parse a received location transmission to extract the received second unique non-locationally associated identifier of the second physical identity target for each of the at least one selected customer locations contained therein;
      iii) select the location records corresponding to each selected customer location, being the selected location records, by matching the received second unique non-locationally associated identifiers with the details of associated identifiers stored within the location records;
      iv) facilitate the selection and ordering of menu items in respect of the at least one selected customer location by:
         (a) identifying menu item records corresponding to available menu items for the selected location records, being available menu item records;
         (b) transmitting the menu item details of the available menu item records for display on a human interface of the customer mobile device;
         (c) permitting the selection of available menu items to be ordered in respect of the at least one selected customer location, being selected menu items, via the human interface and transmitting details of the selected menu items to the server;
      v) processing payment for the transaction by:
         (a) calculating the total payment amount required from the customer for the selected menu items;
         (b) receiving customer payment method details from the customer mobile device;
         (c) triggering an ordering transaction for the total payment amount via the transaction gateway using the customer payment method details from the customer mobile device and the venue payment details from the venue record associated with the selected customer locations; and
         (d) on completion of the payment transaction, transmitting an order for the selected menu items to the menu-associated POS systems outlined in the menu item records associated with the selected menu items;
   wherein the unique non-locationally associated identifier displayed on each physical identity target is not duplicated in respect of more than one physical identity target or in respect of more than one location record across all of the plurality of location-based food-service venues;
   wherein the unique non-locationally associated identifier displayed on each physical identity target does not include any location-specific details of the associated customer location readable by the customer mobile device; and
   wherein each physical identity target contains no human- or device-readable indication of the associated venue record or associated customer location.

2. The method of claim 1, wherein the number of venue-associated POS systems at a venue is one, and all of the location records and menu item records corresponding to the venue are directed to the single POS system.

3. The method of claim 1, wherein the number of venue-associated POS systems at a venue is more than one, and at least one venue-associated POS system identified in a location record or a menu-associated POS system identified in a menu item record are different venue-associated POS systems at the venue.

4. The method of claim 1, wherein the second unique non-locationally associated identifier of the second physical identity target will be read by pre-existing software on the customer mobile device, and the reading of the second unique non-locationally associated identifier will result in the initiation of a location transmission to the server.

5. The method of claim 4, wherein the server is a web server, the second unique non-locationally associated identifier contains a web link and the pre-existing software comprises a reader capable of parsing the identifier to extract the web link, and the pre-existing software also includes a web browser which will open the parsed web link to initiate the location transmission and subsequent payment interaction between the customer and the server.

6. The method of claim 1, wherein a customer mobile device contains a locally installed application for communication with the server and facilitation of the method.

7. The method of claim 1, wherein the transmission of the order to the associated menu-associated POS system includes delivery details for the venue to deliver the completed food order to the selected customer location.

8. The method of claim 1, wherein the transmission of the order to the associated menu-associated POS system includes delivery details for the associated venue to deliver the completed food order to a pickup location other than the selected customer location, at which the customer can pick up the completed order.

9. The method of claim 8, wherein the pickup location is selected from a plurality of pickup locations affiliated with an associated venue-associated POS system.

10. The method of claim 8, further comprising transmission of the details of the pickup location to the customer mobile device of the ordering customer on completion of payment.

11. The method of claim 1, wherein available menu items are selected based upon availability limitations imposed by the location of the selected customer location within the venue.

12. The method of claim 1, wherein the transaction gateway is integrated within the server.

13. The method of claim 1, wherein the transaction gateway is external in network communication with the server.

14. A server configured for use in the processing of ordering transactions in respect of a plurality of location-based food-service venues each containing a plurality of customer locations and at least one network-connected venue-associated POS system, wherein each customer location has a physical identity target attached in proximity thereto, wherein each physical identity target displays a unique non-locationally associated identifier readable by customer mobile devices and wherein the unique non-locationally associated identifier is selected from the group of printed QR codes or printed bar codes, the server comprising:

a) a non-transient computer-readable storage medium having executable instructions, being an order processing software component, embodied thereon;
b) one or more hardware processors configured to execute the instructions;
c) a network interface capable of two-way communication via at least one data network with customer mobile devices as well as with all of the venue-associated POS systems;
d) a transaction gateway through which customer payments can be processed; and
e) an order database comprising:
  i) a venue record corresponding to each location-based food-service venue and containing venue payment details via which payments to the venue can be electronically processed by the transaction gateway and network address details for each venue-associated POS system by which the server can communicate with same;
  ii) a location record corresponding to each physical customer location in each managed venue and containing the unique non-locationally associated identifier of the associated physical identity target and identification of a venue-associated POS system affiliated with the customer location; and
  iii) a menu item record corresponding to each menu item which can be ordered within a venue including purchase information in respect of the menu item and identification of a menu-associated POS system being the venue-associated POS system to which orders for the menu item should be transmitted;

said server operable to store a first unique non-locationally associated identifier that is associated with a first physical identity target;

said server operable to replace the first unique non-locationally associated identifier with a second non-locationally associated identifier that is associated with a second physical identity target when the first physical identity target is replaced with the second physical identity target at a first customer location;

said server operable to process ordering transactions by customers in respect of at least one selected customer location, in communication with the customer mobile device of an ordering customer, by:

i) receiving a location transmission containing the second unique non-locationally associated identifier of the second physical identity target of the at least one selected customer location from a customer mobile device having read and captured the identifier;
ii) parsing a received location transmission to extract the received second unique non-locationally associated identifier of the second physical identity target for each of the at least one selected customer locations contained therein;
iii) selecting the location records corresponding to each selected customer location, being the selected location records, by matching the received second unique non-locationally associated identifiers with the details of associated unique non-locationally associated identifiers stored within the location records;
iv) facilitating the selection and ordering of menu items in respect of the at least one selected customer location by:
  (a) identifying menu item records corresponding to available menu items for the selected location records, being available menu item records;
  (b) transmitting the menu item details of the available menu item records for display on a human interface of the customer mobile device;
  (c) facilitating the selection of available menu items to be ordered in respect of the at least one selected customer location, being selected menu items, via the human interface;
  (d) receiving details of the selected menu items from the customer mobile device;

v) processing payment for the transaction by:
  (a) calculating the total payment amount required from the customer for the selected menu items;
  (b) receiving customer payment method details from the customer mobile device;
  (c) triggering an ordering transaction for the total payment amount via the transaction gateway using the customer payment method details from the customer mobile device and the venue payment details from the venue record associated with the selected customer locations; and
  (d) on completion of the payment transaction, transmitting an order for the selected menu items to the menu-associated POS systems outlined in the menu item records associated with the selected menu items;

wherein the unique non-locationally associated identifier displayed on each physical identity target is not duplicated in respect of more than one physical identity target or in respect of more than one location records across all of the plurality of location-based food-service venues;

wherein the unique non-locationally associated identifier displayed on each physical identity target does not include any location-specific details of the associated customer location readable by the customer mobile device; and wherein each physical identity target contains no human- or device-readable indication of the associated venue record or associated customer location.

15. The server of claim 14 wherein the number of venue-associated POS systems at a venue is one, and all of the location records and menu item records corresponding to the venue are directed to the single POS system.

16. The server of claim 14 wherein the number of venue-associated POS systems at a venue is more than one, and at least one venue-associated POS system identified in a location record or a menu-associated POS system identified in a menu item record are different venue-associated POS systems at the venue.

17. The server of claim 14 wherein the second unique non-locationally associated identifier of the second physical identity target will be read by pre-existing software on the customer mobile device, and the reading of the identifier will result in the initiation of a location transmission to the server.

18. The server of claim 17 wherein the server is a web server, the second unique non-locationally associated identifier contains a web link and the pre-existing software comprises a reader capable of parsing the identifier to extract the web link, and the pre-existing software also includes a web browser which will open the parsed web link to initiate the location transmission and subsequent interaction between the customer and the server.

19. The server of claim 14 wherein the transmission of the order to the associated menu-associated POS system includes delivery details for the venue to deliver the completed food order to the selected customer location.

20. The server of claim 14 wherein the transmission of the order to the associated menu-associated POS system includes delivery details for the venue to deliver the completed food order to a pickup location other than the selected customer location, at which the customer can pick up the completed order.

21. The server of claim 20 wherein the pickup location is selected from a plurality of pickup locations affiliated with an associated venue-associated POS system.

22. The server of claim 20 wherein the server further transmits the details of the pickup location to the customer mobile device of the ordering customer on completion of payment.

23. The server of claim 14 wherein available menu items are selected based upon availability limitations imposed by the location of the selected customer location within the venue.

\* \* \* \* \*